(12) United States Patent
Balakrishnan et al.

(10) Patent No.: US 10,128,763 B2
(45) Date of Patent: *Nov. 13, 2018

(54) OUTPUT-SIDE CONTROLLER WITH SWITCHING REQUEST AT RELAXATION RING EXTREMUM

(71) Applicant: Power Integrations, Inc., San Jose, CA (US)

(72) Inventors: Balu Balakrishnan, Saratoga, CA (US); David Michael Hugh Matthews, Los Gatos, CA (US); Vikram Balakrishnan, Mountain View, CA (US); Roland Sylvere Saint-Pierre, San Jose, CA (US); Zhao-Jun Wang, San Jose, CA (US); Giao Minh Pham, Milpitas, CA (US); Qing McIntosh, San Jose, CA (US)

(73) Assignee: Power Integrations, Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/649,458

(22) Filed: Jul. 13, 2017

(65) Prior Publication Data

US 2017/0310225 A1 Oct. 26, 2017

Related U.S. Application Data

(63) Continuation of application No. 14/520,142, filed on Oct. 21, 2014, now Pat. No. 9,742,288.

(51) Int. Cl.
*H02M 3/335* (2006.01)
*H02M 1/00* (2006.01)

(52) U.S. Cl.
CPC ... *H02M 3/33507* (2013.01); *H02M 3/33592* (2013.01); *H02M 2001/0054* (2013.01); *Y02B 70/1475* (2013.01); *Y02B 70/1491* (2013.01)

(58) Field of Classification Search
CPC ......... H02M 3/33507; H02M 3/33523; H02M 3/335
See application file for complete search history.

(56) References Cited

U.S. PATENT DOCUMENTS 6,456,106 B1 9/2002 Yee
2008/0123377 A1 5/2008 Lin
(Continued)

FOREIGN PATENT DOCUMENTS

EP 2383876 A2 11/2011

OTHER PUBLICATIONS

International Application No. PCT/US2015/056761—International Search Report and Written Opinion, dated Feb. 24, 2016, 16 pages.
(Continued)

*Primary Examiner* — Adolf Berhane
*Assistant Examiner* — Bart Iliya
(74) *Attorney, Agent, or Firm* — Christensen O'Connor Johnson Kindness PLLC

(57) ABSTRACT

A method for regulating a power converter includes initiating a transition of a switch coupled to an input side of the power converter from an OFF to an ON state to regulate a transfer of energy from the input to an output side of the power converter after a switch control signal generator receives an enable signal and if a feedback signal representative of an output of the power converter indicates a change in an output of the power converter. The enable signal is generated to communicate a control signal from the output to the input side in response to a first signal representative of a voltage on an output terminal that oscillates in response to an ending of the transfer of energy. The transition of the switch from the OFF to the ON state occurs substantially at a time that the first signal reaches an extremum.

9 Claims, 11 Drawing Sheets

(56) References Cited

U.S. PATENT DOCUMENTS

| | | | |
|---|---|---|---|
| 2008/0123380 A1 | 5/2008 | Park et al. | |
| 2009/0268487 A1 | 10/2009 | Park | |
| 2012/0230064 A1 | 9/2012 | Yang et al. | |
| 2013/0121049 A1 | 5/2013 | Shi et al. | |
| 2014/0036550 A1 | 2/2014 | Yang et al. | |
| 2014/0098578 A1 | 4/2014 | Halberstadt | |
| 2014/0098579 A1* | 4/2014 | Kleinpenning | H02M 3/33523 363/21.17 |
| 2015/0280584 A1* | 10/2015 | Gong | H02M 3/33515 363/21.13 |
| 2016/0056704 A1* | 2/2016 | Deboy | H02M 3/33592 363/21.13 |
| 2016/0072399 A1* | 3/2016 | Kikuchi | H02M 3/33592 363/21.14 |

OTHER PUBLICATIONS

Kang, S.H. et al., "Efficiency Optimization in Digitally Controlled Flyback DC-DC Converters Over Wide Ranges of Operating Conditions", IEEE Transactions on Power Electronics, vol. 27, No. 8, Aug. 2012, © 2012 IEEE, pp. 3734-3748.

European Patent Application No. 15787848.9—European Office Action dated May 22, 2018, 4 pages.

\* cited by examiner

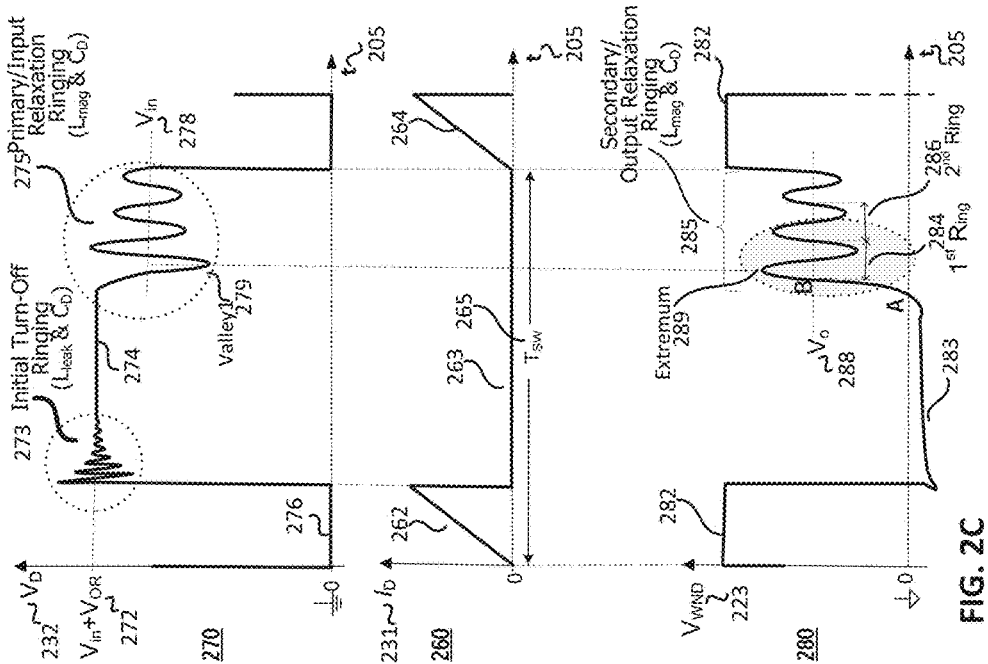
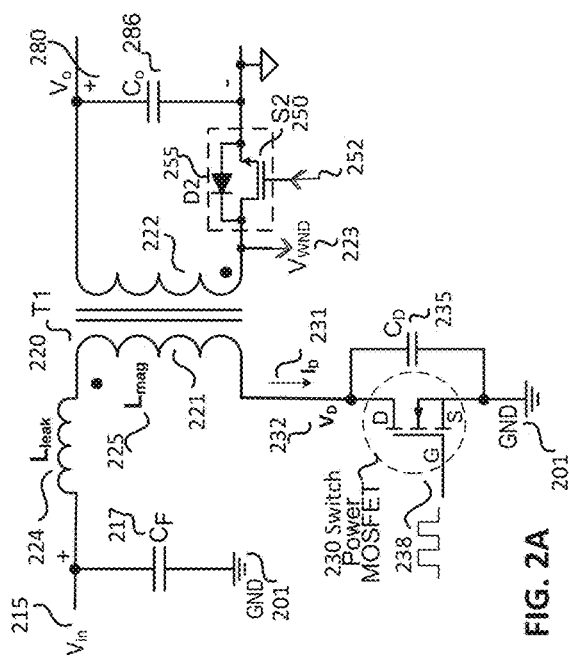
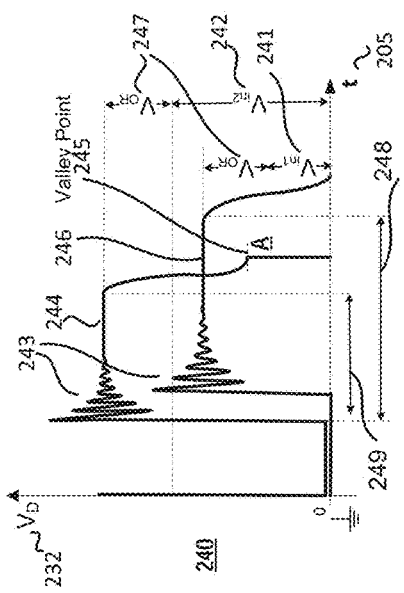
FIG. 2A
FIG. 2B
FIG. 2C

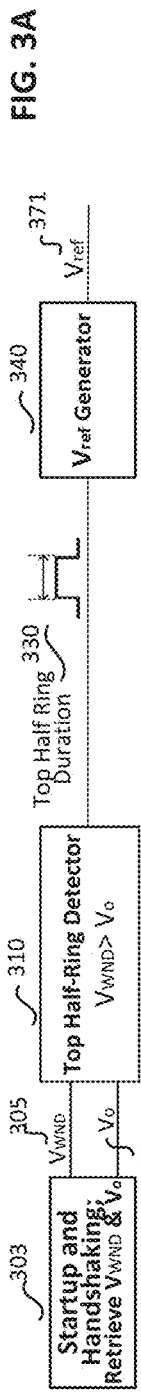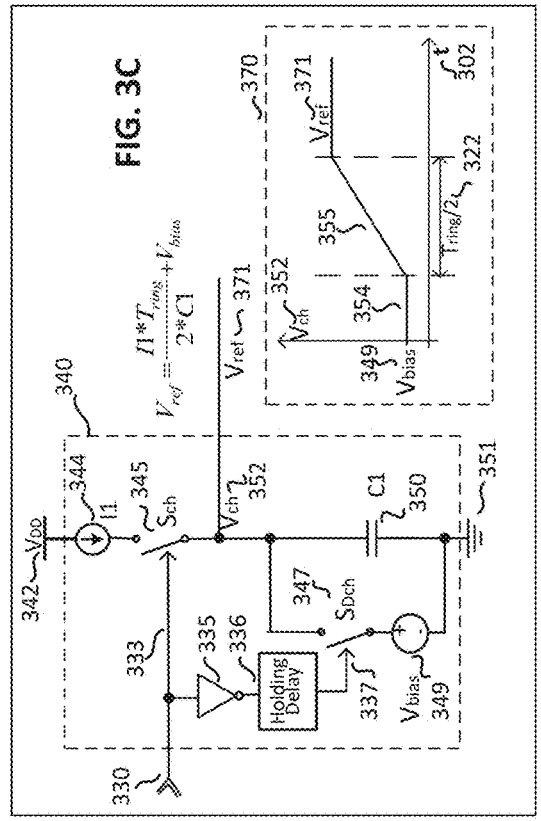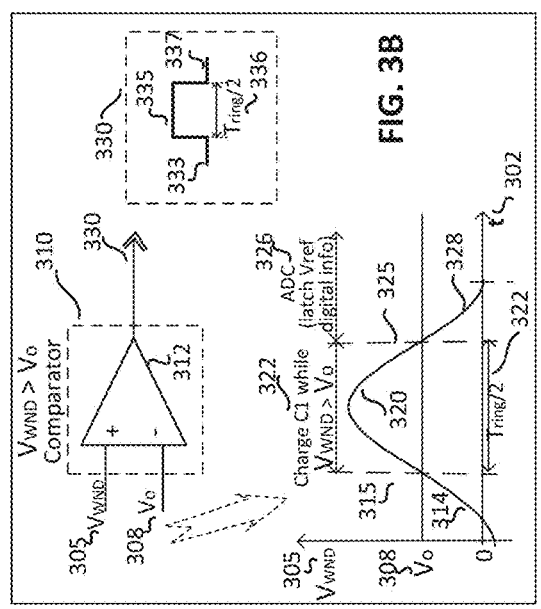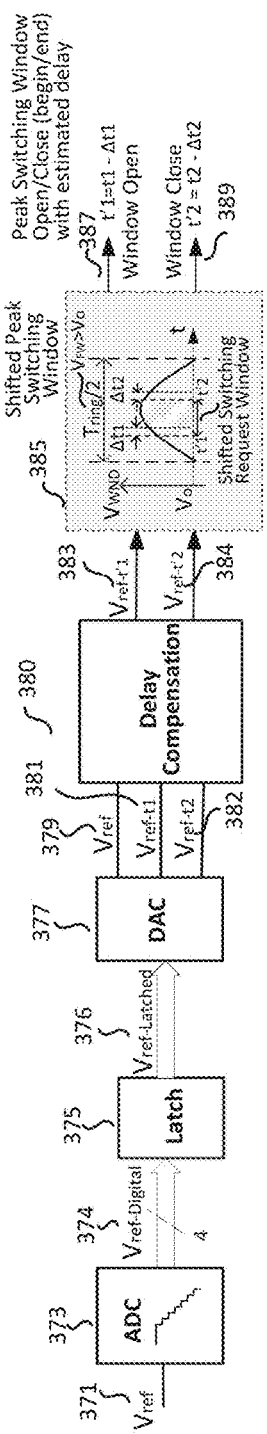

ADC

DAC

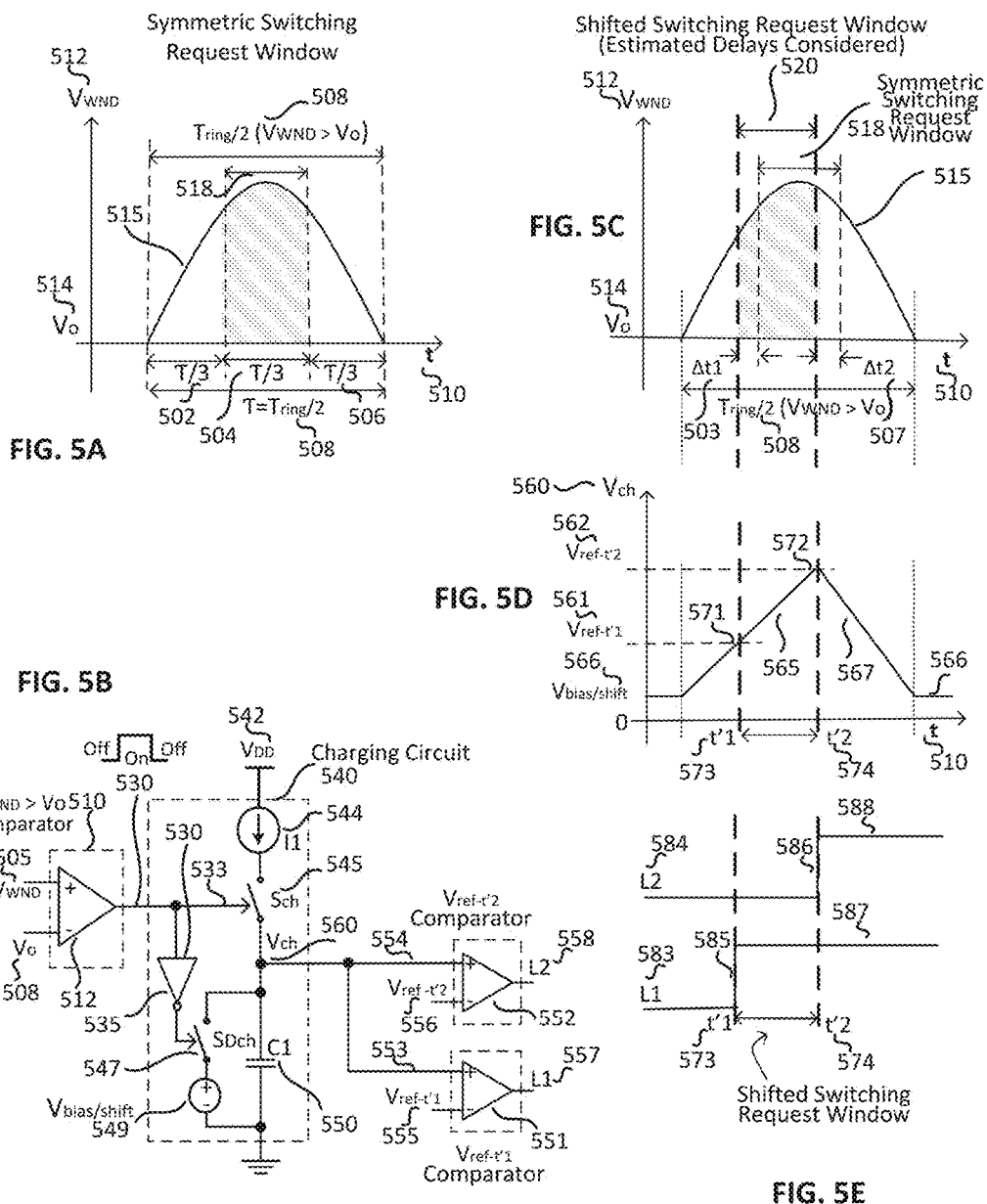

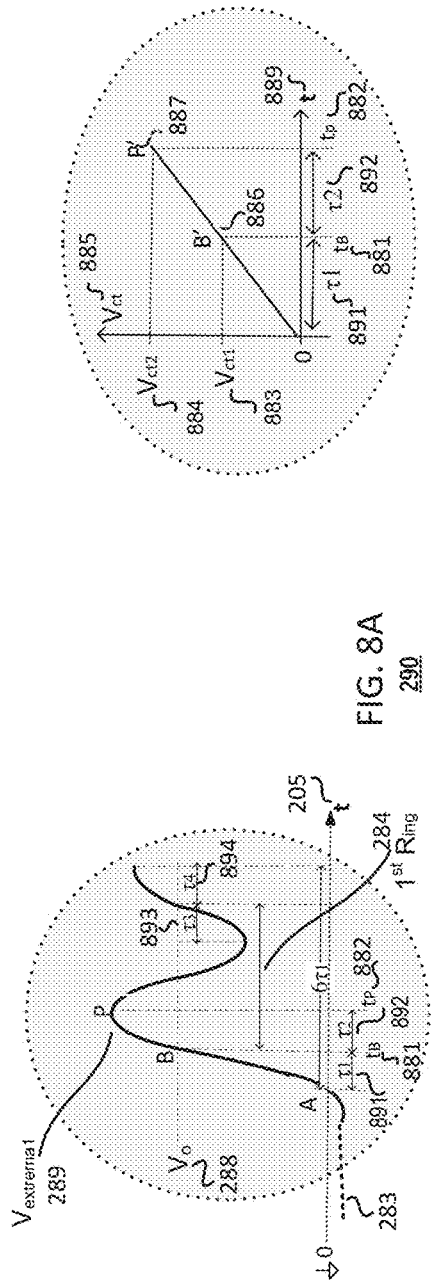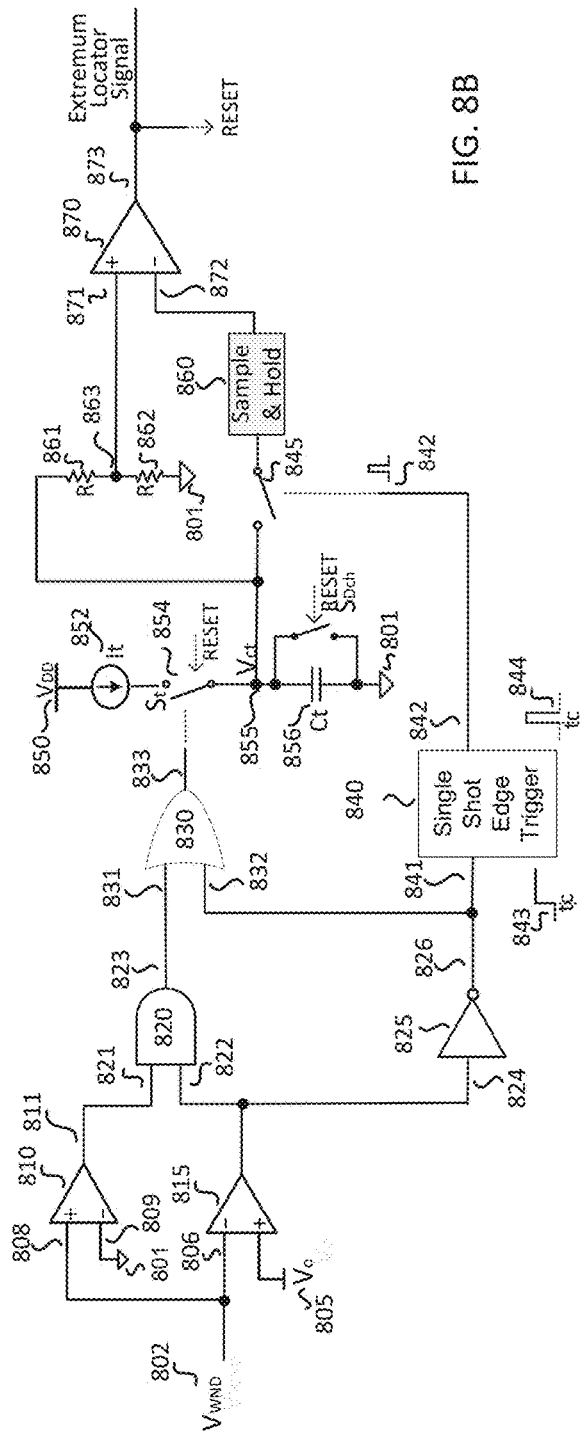

US 10,128,763 B2

OUTPUT-SIDE CONTROLLER WITH SWITCHING REQUEST AT RELAXATION RING EXTREMUM

REFERENCE TO PRIOR APPLICATION(S)

This is a continuation of U.S. application Ser. No. 14/520,142, filed Oct. 21, 2014, now pending. U.S. application Ser. No. 14/520,142 is hereby incorporated by reference.

BACKGROUND INFORMATION

Field of the Disclosure

The present disclosure relates generally to controllers for switched mode power converters and specifically relates to power converters having both an input-side and an output-side controller where the output-side controller communicates a switching request signal to the input-side controller via an isolation barrier to control an input-side switch.

Background

Switch mode power converters are widely used for household or industrial appliances that require a regulated direct current (dc) source for their operation, such as for example battery chargers that are commonly used in electronic mobile devices. Off-line ac-dc converters convert a low frequency (e.g., 50 Hz or 60 Hz) high voltage ac (alternating current) input voltage to a required level of dc output voltage. Various types of switch mode power converters are popular because of their well regulated output, high efficiency, and small size along with their safety and protection features.

Safety requirements for isolated switch mode power converters generally require the use of high frequency transformers to provide galvanic isolation between the inputs and outputs of the switch mode power converters in addition to the voltage regulation at the output. Popular topologies of isolated switch mode power converters may include flyback, forward, isolated half/full bridge, among many others including resonant types.

One source of loss in switch mode power supplies is the switching loss during turn on and turn off of the power switch. In an isolated switch mode power converter High Frequency (HF) turn on oscillations may happen due to resonance between the leakage inductance of the transformer and the output capacitance of the power switch (e.g., total parasitic capacitance across the power MOSFET). In discontinuous current mode DCM operation of an isolated switch mode power converter, in addition to above mentioned HF turn on oscillations, a second lower frequency oscillation may also happen between the magnetic inductance of the transformer and the output capacitance of the power switch. This second lower frequency oscillation may often be referred to as a quasi resonance (QR) mode of operation. One method of reducing the turn ON losses in an isolated DCM switch mode power converter is the quasi resonant valley switching of the power switch, where an input parameter, such as switch current, is directly monitored so that a voltage across the input-side switch is at or near a minimum when the input-side switch is turned ON.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 2A illustrates an example isolated power converter.

FIGS. 2B and 2C illustrate various waveforms associated with the transfer of energy through the power converter of FIG. 2A.

FIG. 3A is a functional block diagram of a first portion of an example extremum locator, in accordance with the teachings of the present disclosure.

FIG. 3B is an example circuit diagram of the top-half ring detector of FIG. 3A.

FIG. 3C is an example circuit diagram of the reference voltage generator of FIG. 3A.

FIG. 3D is a function block diagram of a remaining portion of the example extremum locator of FIG. 3A.

FIG. 5A illustrates a symmetric switching request window waveform, in accordance with the teachings of the present disclosure.

FIG. 5B is an example circuit diagram of a charging circuit, in accordance with the teachings of the present disclosure.

FIG. 5C illustrates a shifted switching request window waveform for delay compensation across an isolated interface, in accordance with the teachings of the present disclosure.

FIG. 5D illustrates a charging voltage waveform corresponding to the charging voltage of FIG. 5B.

FIG. 5E illustrates example open and close switching window signals.

FIG. 8A illustrates an expanded portion of the waveform of FIG. 2C.

FIG. 8B is an example circuit diagram illustrating one possible implementation of the extremum switching window enable block of FIG. 7A.

FIG. 8C illustrates a charging voltage waveform corresponding to the charging voltage of FIG. 8B.

Figure 1A:
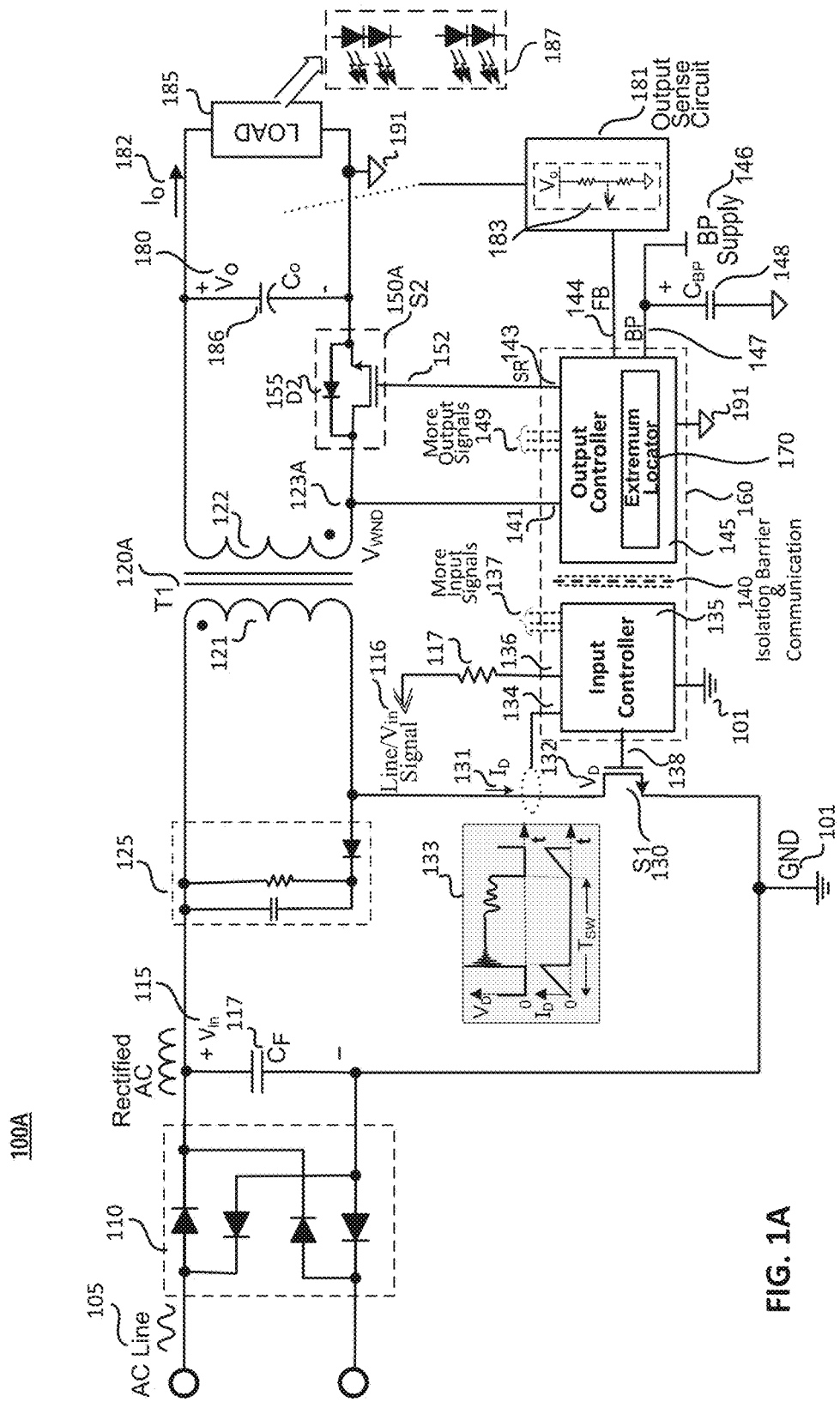
FIG. 1A shows an example isolated power converter having an output controller with an extremum locator, in accordance with the teachings of the present disclosure.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

As mentioned above, isolation is often provided in switch mode power converters using external isolation components such as, for example an opto-coupler or through an extra bias (e.g., feedback) winding on the transformer core that is magnetically coupled to the secondary winding. Some products and applications may require low output voltages, such as for example 5V and below. In these low voltage cases, synchronous rectification may be utilized to achieve high efficiency and also a compact form factor. Synchronous rectification replaces an output rectifier diode with synchronized rectifier switch (e.g., a MOSFET) that is switched to behave like a rectifier to reduce voltage drop and power loss. In one example, an input controller on the input side of a synchronous flyback switch mode power converter controls the input power switch in reference to an input ground reference. In one example, the input controller circuit and input side switch may be implemented with a monolithic or hybrid structure in the input controller IC. Continuing with this example, a secondary controller on the secondary side of the synchronous flyback switch mode power converter controls the synchronized rectifier switch in reference to an output ground reference. The switching action of the synchronized rectifier switch is synchronized with switching of the input side switch with well-controlled isolated gating signals.

A secondary controller for a flyback converter may provide tighter output regulation and faster response to load transients. However, as discussed previously, conventional methods of output control often use external isolation devices, such as for example opto-couplers. The input and output controllers, even though referenced to different grounds, should still be able to reliably communicate between themselves, such as through a magnetic coupling between the input and output controllers. As used herein a "ground" or "ground reference" may refer to a reference point in an electrical circuit from which voltages are measured, a common return path for electric current, or a direct physical connection to the Earth.

In operation of an example synchronous flyback power converter, during an off time period of the input side switch, the output rectifier is conducting (e.g., transferring energy to the output). Also during this off time period, the secondary output voltage reflects to the input side and adds up to the input voltage across the switch. During Continuous Conduction Mode (CCM) the secondary rectifier is still conducting when the input side switch turns back on. Thus, the voltage across input side switch is defined by $V_{in}+V_{OR}$, where $V_{in}$ is the input bus voltage (e.g., rectified line voltage) across the input winding and $V_{OR}$ is the output voltage reflected to the input side. To minimize switch turn on stress and reduce the switching loss, the reflected output voltage $V_{OR}$ should be as near as possible to $V_{in}$. However, in Discontinuous Conduction Mode (DCM) of operation, before the input side switch turns on, the secondary rectifier stops conducting and relaxation ringing due to the secondary parasitic inductance and capacitance happens. Each peak (extremum) point of the relaxation ringing at secondary side presents a valley point of the reflected ring at the input side which provides a time at which the voltage across the input side switch it at or near a minimum to reduce switching loss during turn on of the input side switch.

Accordingly, embodiments of the present disclosure provide a method and apparatus for quasi resonance QR low loss switching control. Embodiments discussed herein may be applicable to isolated (e.g., synchronous flyback) or non-isolated (e.g., Buckboost) switch mode power converters where the output controller is referenced to a different ground and may communicate to the input controller to command the switching of the input side switch. The output controller may avoid any unwanted additional size and cost to the switch mode power converter while providing an isolated efficient control of the input side switch from the output controller. Some embodiments discussed herein locate (e.g., estimate timing) of the local extrema on relaxation oscillation/ringing waveform on the output winding terminal of the energy transfer element that happen during DCM operation of the power converter at a time interval when the energy transfer to the load has ended and output diode has stopped conducting before the end of switching cycle. As used herein "extremum" or "extrema" includes any local maximum or minimum points or may be referred to as "peaks" and "valleys", where mathematically, the slope (i.e., derivative of the ringing/oscillation waveform) approaches zero.

Embodiments discussed herein may include an output controller that provides an input switching request signal substantially at a time of the extremum of the voltage waveform at the output terminal of the energy transfer element. In one embodiment, providing the input switching request signal substantially at a time of the extremum includes generating the input switching request signal at or near a time of the extremum. In another embodiment, providing the input switching request signal substantially at a time of the extremum includes generating the input switching request signal during a switching request window time period that includes the time at which the extremum occurs. In yet another embodiment, providing the input switching request signal substantially at a time of the extremum includes estimating the time of the extremum and generating the input switching request signal at the estimated time. Providing the input switching request signal substantially at the time of the extremum may also include generating the input switching request signal such that the input side switch transitions from an OFF state to an ON state at or near the time of the extremum, at or near the estimated time of the extremum, or during or near the switching request window. Such a output controller may provide for efficient switching of the input side switch with minimal turn on loss and also increases the efficiency of the power converter.

For example, in an output side control power converter the output controller, which is referenced to the output ground reference, senses the output, controls and synchronizes the input switching and regulates transfer of energy to the output. In DCM operation efficiency may be increased by reducing switching loss of the input side switch. The input switching is commanded through an isolation barrier by the output controller by detecting the extrema location on the relaxation ringing (quasi resonance oscillations) that happens on output winding terminal at the end of output rectifier conduction interval. In one example, the extrema (e.g., peak) detection could be within a time window defined around the peak location at half ring oscillation above the output voltage. Thus, embodiments discussed herein provide methods and apparatus that provide extrema switching request for DCM operation of a power converter, where exchange of control signals from output to input and vice versa are across an isolation barrier.

FIG. 1A shows an example isolated power converter 100A illustrating a control circuit 160 having an output controller 145 with an extremum locator 170, in accordance with the teachings of the present disclosure. The example implementation of FIG. 1A is an isolated synchronous flyback power converter where input controller 135 and an output controller 145 are linked through an isolated communication interface 140 (e.g., magnetic coupling).

Also shown in FIG. 1A is a full-bridge rectifier 110 that is coupled to ac line 105 to generate rectified ac 115, which is filtered by capacitance $C_F$ 117. The rectified ac 115 is coupled to be received by energy transfer element 120A, which includes an input winding 121 and an output winding 122 as shown. In the illustrated example, clamp circuit 125 is coupled across input winding 121 of energy transfer element 120A as shown.

In the depicted example, an input side switching device S1 130 is coupled to the input side of power converter 100A, which is referenced to the input ground reference 101 and coupled to the energy transfer element 120A at input winding 121. In some examples, switching device S1 130 may be included in a monolithic or hybrid structure in the same integrated circuit package 160. As shown in the depicted example, switching device S1 is controlled by control signal 138 from the input controller 135 that is referenced to input ground reference 101 and regulates the energy transfer through input winding 121 of transformer 120A to the secondary winding 122 in response to line and load changes. Voltage across the switch 130, that in example of a MOSFET power switch is the drain voltage $V_D$ 132 and current to the drain $I_D$ 131 are illustrated by the symbolized waveforms 133 which are explained in more detail in FIG. 2A-C. Clamp circuit 125, which in the illustrated example is a diode-resistor-capacitor circuit, is coupled across input winding 121 to clamp the turn-off spikes that result from the leakage inductance from input winding 121 across the switching device S1 130.

As shown in the example of FIG. 1A, output side rectifier switch S2 150A and the parallel diode D2 155 are coupled to the secondary winding 122 at the secondary side and serve as a synchronous rectifier of synchronous flyback converter 100A. In the illustrated example of power converter 100A, the output side rectifier switch S2, 150 with parallel diode D2 155 only conducts current during an off-time of the input side switch 130. In one example, the diode D2 155 is an externally connected Schottky diode.

In one example, switch S2 150 is controlled by a signal from the SR pin 143 of the output controller 145. Whenever the voltage at SR terminal 143 rises to a value higher than the gate threshold voltage, the synchronous rectifier provided by switch S2 150 begins conducting current. The secondary ripple is smoothed by output filter capacitance Co 186 and the dc output voltage Vo 180 is applied to load 185 with load current Io 182. The output voltage Vo 180 is sensed through the output sense circuit 181 that in one example may include a resistive divider 183. The feedback signal from the output sense circuit 181 is coupled to pin FB 144 of the output controller 145.

In one example, feedback signal (through FB 144) that is either a digital or an analog signal in combination with the information provided at pin 141 and pin 143 of the output controller 145 could be used to determine an input switching request signal that is transmitted (communicated) through the isolated communication link 140 (in one example may be magnetic coupling through lead-frame or bond wire) and is received by the input controller 135 in reference to the input ground reference 101.

Terminal 141 receives voltage signal $V_{WND}$ 123A at secondary winding 122 that presents an inverted waveform of the drain voltage $V_D$ 132 at input side. As will be discussed below, extrema locator 170 may estimate a time at which the voltage signal 123A reaches an extremum and then enables output controller 145 to communicate the switching request signal to initiate the turn on of input side switch 130. The input controller 135 receives the switching request signal transferred from output controller 145 through the isolation barrier and communication link 140. The line/input voltage $V_{in}$ information signal 116 is taken from an input sense circuitry (e.g., an RC circuit or other well-known line sense circuitry, not shown, coupled to the rectified ac bus 115). The line/input voltage information 116 may be coupled as a current signal through a resistor 117 on terminal 136 of the input controller 135.

The sensed switch drain current $I_D$ 131 signal is received (in one example through an integrated sense FET) and coupled to terminal 134. It is appreciated that based on design and the converter extra features/protection required there may be some more input control signals 149 received/coupled to terminals 137 of the input controller 135. The input controller 135 generates the switching control signal (e.g., the gate signal) 138 based on the switching request signal transferred from output controller 145 in combination with other signals from input side. The gate control signal 138 controls switching of switch S1 130 to regulate the transfer of energy through energy transfer element 120A to the output. The supply for output controller may be provided through the bypass pin BP 147 across a bypass capacitor 148 that is externally coupled to a bypass BP supply 146.

The input controller 135 controlling switch S1 130 is referenced to the input ground reference 101 and the output controller 145 which controls switch S2 150 (with parallel diode D2 155) is referenced to the output ground reference 191. Communication between the input controller 135 and output controller 145 should be through a galvanic isolation (e.g., magnetically coupled communication link 140). In one example, the isolated communication link 140 may be unidirectional or bidirectional (consisting of single or multiple communication links).

Figure 1B:
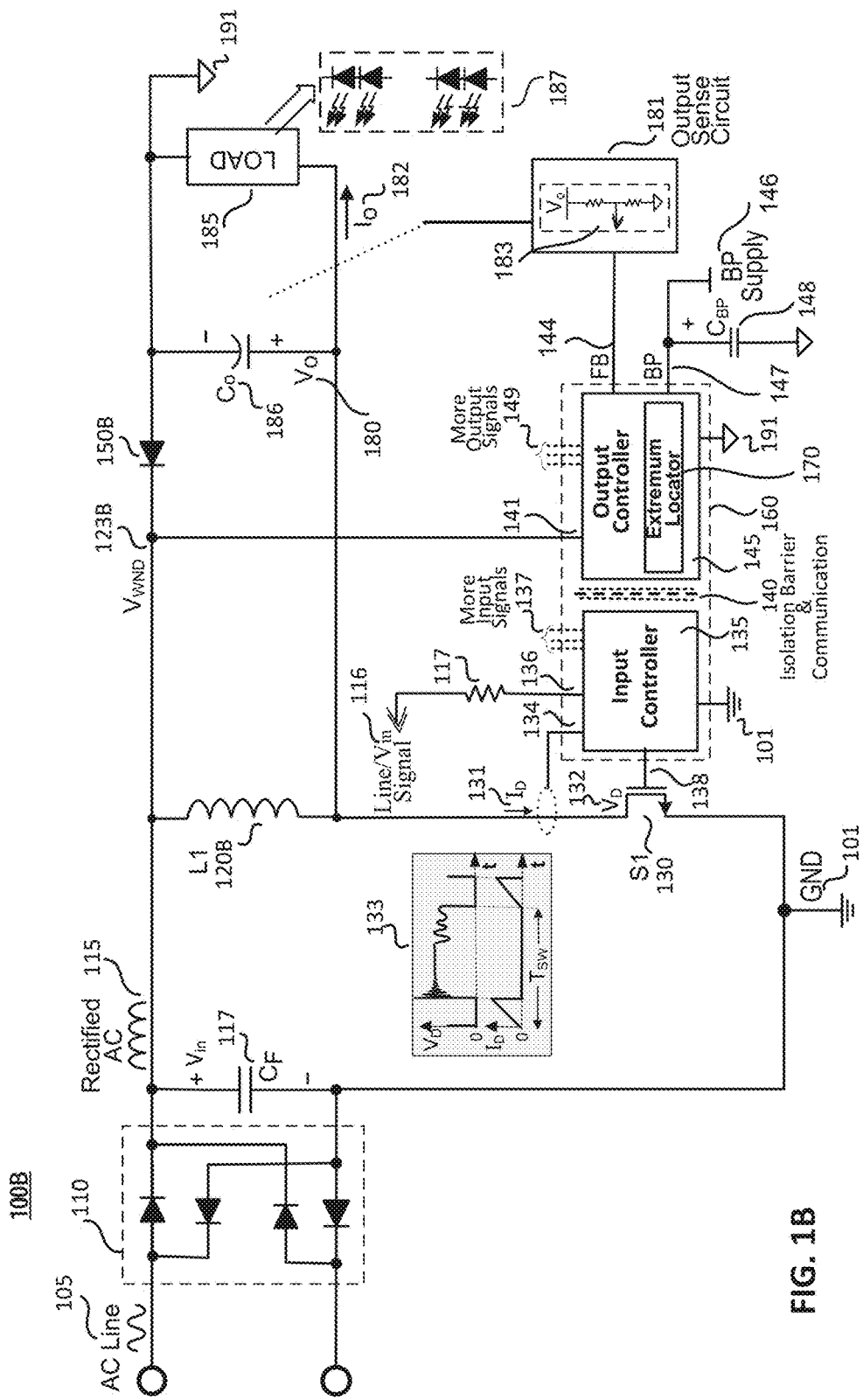
FIG. 1B shows an example non-isolated power converter having an output controller with an extremum locator, in accordance with the teachings of the present disclosure.

FIG. 1B shows an example non-isolated power converter 100B having an output controller 145 with extremum locator 170, in accordance with the teachings of the present disclosure. FIG. 1B shows an implementation of a non-isolated buck-boost converter based on another embodiment. As illustrated in the example of FIG. 1B, even though the input and output circuits are not galvanically (electrically) isolated, the reference levels for input circuits (input ground reference 101) and output circuits (output ground reference 191) are different and the input and output controllers, 135 and 145 respectively, can only communicate through an isolation barrier 140.

The input side components of power converter 100B have similar functions as described previously with reference to FIG. 1A. However, the energy transfer element in FIG. 1B has a single winding L1 120B and the output rectifier which is shown as a diode 150B requires no synchronous control signal. Thus, in the output controller 145 the synchronous control terminal (SR 143 on FIG. 1A) is not shown. When switch S1 130 is closed the energy is stored in L1 120B and because of the blocking direction of the output diode 150B no energy could be transferred from input to the output. During this interval the output load 185 (that in one example may be LED array 178) is fed through the bulk output capacitor Co 186.

When switch S1 130 turns OFF (opens), inductor current at forward direction of diode 150B flows to the output to recharge the bulk output capacitor Co 186 and feed the load 185. Functionality of the input 135 and output 145 controllers may remain the same as explained in FIG. 1A except that the output synchronous rectifier control signal and the SR terminal of the controller is not required and are not shown.

FIG. 2A illustrates an example isolated power converter. FIGS. 2B and 2C illustrate various waveforms associated with the transfer of energy through the power converter of FIG. 2A. As shown in the partial schematic of FIG. 2A, the input and output windings 221 and 222 of the transformer 220 include a magnetic inductance at input side $L_{mag}$ 225 and a leakage of input winding inductor $L_{leak}$ 224. The rectified line voltage 215 across the input capacitance $C_F$ 217 is in reference to input ground reference 201 and is applied to the input winding 221. The switching device that in one example may be a power MOSFET 230 with drain current $I_D$ 231 and drain voltage $V_D$ 232 is coupled in series with the input winding 221. The output winding 222 of transformer 220 is coupled to the output rectifier switch S2 250 with parallel diode 255 (either an external diode or the body diode of a MOSFET switch). The Control terminal/gate of the input switch S1 230 receives switching signals 238 from input controller (e.g., 135 in FIG. 1) in reference to input ground reference 201 while output switch S2 250 receives switching signals 252 from output controller (e.g., 145 in FIG. 1) in reference to output ground reference 291. Isolated communication between the input and output controller synchronize switching/conduction of input switch S1 230 and output switch S2 250. The synchronized complementary switching of the input switch S1 230 and output switch S2 250 controls transfer of energy from input to output to regulate output voltage Vo 280 across the output capacitor Co 386. Waveforms of switch voltage 232 $V_D$ in two different conditions of line voltage are depicted in more detail in FIG. 2B for one switching cycle versus time t 205. Waveform 246 at low input voltage $V_{in1}$ 241 presents a CCM or Critical mode of operation that at drain turn-off after a high frequency parasitic oscillation 243 (due to $L_{leak}$ & $C_p$) drain voltage settles on ($V_{in1}+V_{OR}$) 246 (low input voltage $V_{in1}$ 241 plus the output voltage reflected to the input $V_{OR}$ 247). At the end of output rectifier conduction interval 248 the input drain voltage may drop to zero before the next cycle of the input switch turn on. On the other hand, in graph 244, which is at high input voltage $V_{in2}$ 242, the drain off voltage when settled ($V_{in2}+V_{OR}$) 244 after the high frequency parasitic oscillation 243, shows a higher amplitude (assuming the same $V_{OR}$ and $V_{in2}>V_{in1}$). The mode of operation has changed to DCM and at the end of output conduction interval 249, the input drain voltage may show some relaxation oscillation (symmetric around $V_{OR}$) that could drop the drain voltage to some valley value (point A 245) other than zero. By synchronizing the next switch turn-on at or near the valley point A 245 the switching loss may be reduced and efficiency of converter increased.

In FIG. 2C, graph 270 depicts an example of input drain voltage $V_D$ 232 in one switching cycle in DCM mode of operation along with the input switch current 231 $I_D$ in graph 260 and along with graph 280 flyback output winding voltage $V_{WND}$ 223 appearing on terminal 141 of output controller 145. The input switch drain voltage $V_D$ 232 is the same as explained in FIG. 2B. After almost zero drop 276 during conduction drain voltage jumps up at turn-off and after some parasitic oscillation 273 it settles 274 on ($V_{in}+V_{OR}$) 272 while output rectifier switch (body diode) is conducting; when output rectifier (switch body diode) stops conducting the relaxation oscillation 275 happens (around $V_{in}$ 278) that generates some peak and valley voltage points across the switch (due to resonance between magnetic inductance at input side and the stray capacitance of transformer winding and the Mosfet switch). FIG. 2C Graph 260 depicts one switching cycle $T_{SW}$ 265 of input switch current $I_D$ 231 which has a linear ramp up 262 during input switch on-time (drain voltage almost zero 276) and drops to almost zero 263 during input switch off-time before ramping up in next switch turn-on 264. FIG. 2C graph 280 presents voltage on output winding $V_{WND}$ 223 (that appears on terminal 141 of the output controller 145) on the same time scale as graphs 270 and 260. When input switch is conducting during on-time and output rectifier blocks the current to the output, input voltage on input winding scaled with the transformer ratio appears on the output winding (voltage level 282). During input switch turn-off the $V_{WND}$ 223 drops below zero (as the output rectifier voltage drop, ~0.6-0.7 V). After the transfer of energy to output is complete and output rectifier stops conducting, the output relaxation ringing 285 starts and several oscillation periods may happen around output voltage Vo 288 before the next switching cycle turn-on. The first and second ringing periods $1^{st}\,R_{ing}$ 284 and $2^{nd}\,R_{ing}$ 286 are shown on graph 280. The output relaxation ringing shows a reverse direction of variation slope compared to the input side oscillation of graph 270. In the other words, the valley ringing of input side (e.g., valley1, 279) appears as a peak ringing at the output side (e.g., Extremum 289).

FIG. 3A is a functional block diagram of a first portion of an example extremum locator, in accordance with the teachings of the present disclosure. FIGS. 3A-D illustrate an extremum locator that implements the first step in generating a switching request window within which to enable the output controller to communicate a switching request signal. In one embodiment, the switching request window is based on a half ring period of the relaxation oscillation that is determined during an initial communication (handshaking) between input controller 135 and output controller 145. In one embodiment, switching of the power switch may be inhibited or disabled for a time period during the handshaking period (e.g., for 30 us after a first switching cycle). In this embodiment, disabling switching of the power switch for the time period may force operation of the power converter into a discontinuous conduction mode (DCM) of operation such that relaxation ringing may occur at the output terminal of the energy transfer element. With relaxation ringing at the output terminal of the energy transfer element, extremum locator may then determine or estimate the time of one or more extrema.

As depicted in FIG. 3A, a winding voltage signal $V_{WND}$ 305 from output winding and output voltage signal Vo 308 from output are received by block 310 of Top Half Ring Detector which outputs a logic high signal for the top half ring duration signal 330 ($V_{WND}$>$V_O$). The half ring duration signal 330 is then provided to reference voltage $V_{ref}$ generator block 340 which then generates a reference voltage which may be a linear charge up voltage (as depicted in graph 370 and explained in FIG. 3C).

FIG. 3B is one possible implementation of the top half ring detector block 310. Comparator 312 in block 310 receives $V_{WND}$ signal 305 at non-inverting input and signal Vo 308 at inverting input and outputs logic signal 330 which is used as a drive signal. FIG. 3C is one possible implementation of reference voltage generator 340. As shown in FIG. 3C, logic signal 330 is received to control a switch 345 to charge a timing capacitor C1 350. In FIG. 3B, one ringing period of the relaxation oscillation after output rectifier switch stops conducting in DCM mode of operation is shown versus time t, 302 in comparison to the output voltage Vo 308. The output winding voltage $V_{WND}$ 305 is compared to Vo 308 and while the top half ring 320 for the interval of $T_{ring}/2$ 322 between time lines 315 and 325 is higher than Vo 308 the output signal 330 of the comparator is logic high (to keep the charging switch $S_{ch}$ 345 in FIG. 3C closed and the discharging switch $S_{Dch}$ 347 open). At the intervals when the ringing voltage goes below Vo 308 (sections 314 and 328) the signal 330 is at logic low (that opens the charging switch $S_{ch}$ 345 in FIG. 3C and closes the discharging switch $S_{Dch}$ 347 to discharge C1 down to the minimum bias voltage $V_{bias}$ 349).

The constant current source I1 344 from supply $V_{DD}$ 342 charges the timing capacitor C1 350 through switch $S_{ch}$ 345 with a linear constant rate so that the voltage $V_{ch}$ 352 across the capacitor presents the charging time. The final charged voltage across capacitor C1 350 for the whole top half ring duration 322 ($V_{WND}$>$V_O$) will result in $V_{ref}$ 371. Inverter 335 may provide a complementary signal that goes logic high when signal 333 drops to logic low. This complementary signal with some holding delay through block 336 generates the switching signal 337 for the discharge switch $S_{Dch}$ 347. The holding delay (e.g., around 30 us) is provided to convert the detected $V_{ref}$ to digital and latch it to be used in the normal operation. After the holding delay the signal 337 goes to logic high and closes discharge switch $S_{Dch}$ 347 to discharge capacitor C1 350 to a minimum level bias voltage $V_{bias}$ 349 that defines the starting voltage level 354 for the next charging cycle. At the end of the top half ring 320 (after interval $T_{ring}/2$ 322 at time line 325) the charged voltage on timing capacitor C1 350 reaches and stays on $V_{ref}$. The $V_{ref}$ value may be transferred to digital and latched to be used during the DCM switching cycles to define the switching request window. Graph 370 in FIG. 3C presents the charging voltage $V_{ch}$ 352 across the timing capacitor C1 350 versus time t 302 that starts from a minimum bias voltage $V_{bias}$ 349 (with a voltage level 354 that is the sustained voltage level after discharge of C1 350 before switch $S_{ch}$ 345 closes). During the top half ring, interval $T_{ring}/2$ 322, the $V_{ch}$ 352 charges linearly with a constant slope (linear section 355) and at the end of $T_{ring}/2$ interval (top half ring 320) has risen to $V_{ref}$ level 371 and is held for a holding delay interval until it is converted to digital and latched to be used in normal operation:

$$V_{ref} = \frac{I1 * T_{ring}}{2 * C1} + V_{bias} \qquad \text{EQ. 1}$$

FIG. 3D is a function block diagram of a remaining portion of the example extremum locator of FIG. 3A. The output from $V_{ref}$ generator block 340 is a reference voltage $V_{ref}$ 371 that through the ADC block 373 is transferred to a digital signal $V_{ref-Digital}$ 374 (that in one example is a 4-bit digital signal). The digital signal $V_{ref-Digital}$ 374 is then latched (block Latch 375) and output signal $V_{ref-Latched}$ digital signal 376 would be converted to analog in DAC block 377 utilized in the normal analog process of each switching cycle to define signals $V_{ref}$ 379, $V_{ref-t1}$ 381 and $V_{ref-t2}$ 382. In one example, $V_{ref-t1}$ and $V_{ref-t2}$ are fractions of $V_{ref}$. In one example, $V_{ref-t1}$ and $V_{ref-t2}$ may be ⅓ and ⅔ of $V_{ref}$, respectively. Considering the applied bias voltage $V_{bias}$ 349, $V_{ref-t1}$ and $V_{ref-t2}$ may be written as: $V_{ref-t1}=[⅓*(V_{ref}-V_{bias})+V_{bias}]$ and $V_{ref-t2}=[⅔*(V_{ref}-V_{bias})+V_{bias}]$. In one embodiment, to compensate for the unwanted propagation delays of different circuit blocks of the control an estimated predefined delay should be applied. In one example, the delay may be applied in block 380 by shifting down the peak window reference voltages (as will be explained in FIG. 4B by disconnecting some of current sources in the DAC; e.g., current sources 435 and 436). This results in the shifted references $V_{ref-t'1}$ 383 and $V_{ref-t'2}$ 384 wherein $V_{ref-t'1}=V_{ref-t1}-\Delta V1$ and $V_{ref-t'2}=V_{ref-t2}-\Delta V2$. In one embodiment, $\Delta V1=\Delta V2=\Delta V$ and in another embodiment $\Delta V2>\Delta V1$ to predict a more realistic compensation of propagation delay between and/or within the circuitry of the control circuit. Thus, the peak switching window can be generated as depicted in the graphic block 385, where the timing t'1=t1−Δt1 and t'2=t2−Δt2. Timing signals t'1 and t'2 present the window open/begin (left border of the window) and window close/end (right border of the window) with the estimated delay. In one embodiment, Δt1=Δt2=Δt; however, for a more realistic compensation of the propagation delay in the control circuit the timing shift Δt2 for close/end of the peak switching window can be adjusted more than the timing shift Δt1 for open/begin of the peak switching window (i.e., Δt2>Δt1).

It is appreciated that in other embodiments the width of the peak switching window may be further narrowed down and in an example the width of the peak switching window may be defined as ⅕ of the half ring period (e.g., $V_{ref-t1}$=⅖ $V_{ref}$ and $V_{ref-t2}$=⅗ $V_{ref}$). It is also appreciated that in other implementation design examples the shift of the peak switching window to compensate for the propagation delay of the control blocks can be implemented in different ways, e.g; directly through the holding time blocks or by shifting references $V_{ref-t'1}$ 383 and $V_{ref-t'2}$ 384 to define the thresholds for the begin and end (open/close) of the peak switching window. Thus, the peak switching window can be generated as depicted in the graphic block 385, where the timing t'1=t1−Δt1 and t'2=t2−Δt2. Timing signals t'1 and t'2 present the window open/begin (left border of the window) and window close/end (right border of the window) with the estimated delay.

Figure 4A:
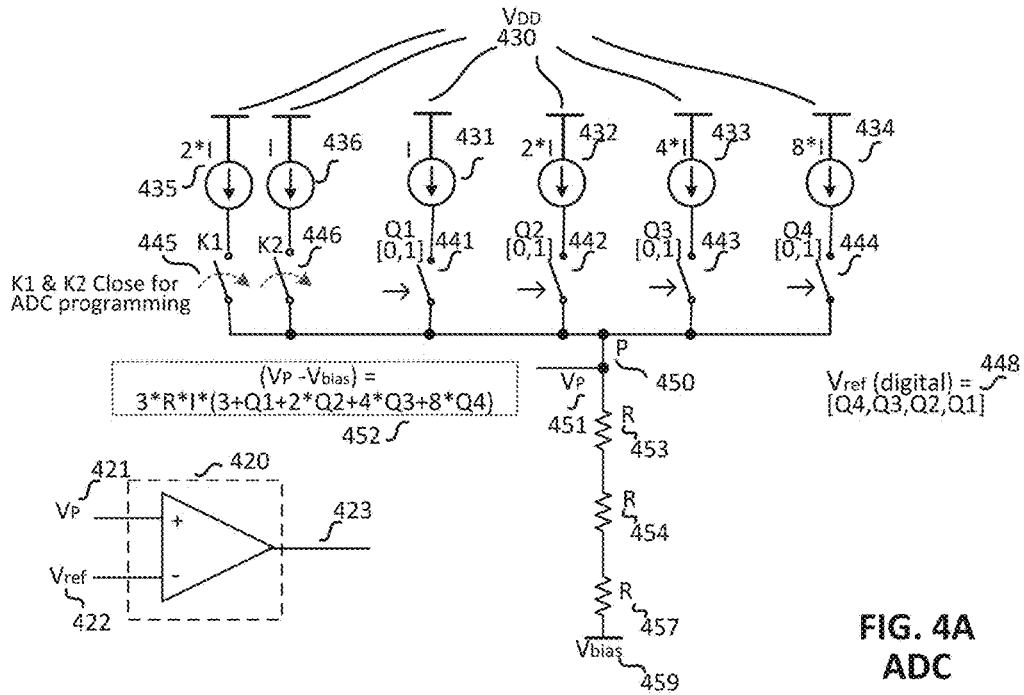
FIG. 4A is an example circuit diagram of the analog-to-digital converter (ADC) of FIG. 3D.

FIG. 4A is an example circuit diagram of the analog-to-digital converter (ADC) of FIG. 3D. FIG. 4A shows the ADC conversion of the reference voltage $V_{ref}$. The constant current sources 431, 432, 433 and 434 are weighted 1*I, 2*I, 4*I and 8*I respectively and are coupled from the VDD supply 430 to switches Q1 441, Q2 442, Q3 443 and Q4 444 which are controlled between ON [1] or OFF [0] states. The extra current sources 435 "2*I" and 436 "I" through switches K1 445 and K2 446 may feed extra current to shift the potential. During process of ADC, switches K1 and K2 are closed and voltage drop on the resistors is shifted up. The weighted currents by the 4-bit binary digits [0,1] of the $V_{ref}$ value 422 is converted to Vref-digital=[Q4,Q3,Q2,Q1] 448.

The constant current sources through the supply $V_{DD}$ 430 feed current in parallel to node P 450 and to the series resistors 453, 454 and 457. Switches Q1, Q2, Q3 and Q4 are sequentially closed and voltage on node P 450 ($V_P$) which is the voltage drop due to the sequentially increased current on the series resistors (3R) is compared on the positive input 421 of comparator 420 to the reference voltage $V_{ref}$ on the negative input 422 of the comparator 420. At the position when voltage on node P equals the reference voltage, defined in the handshaking process of FIG. 3C ($V_{ref}$ 371), the value of: ($V_{ref}-V_{bias}$)=($V_P-V_{bias}$)=3*R*I*(3+Q1+2*Q2+4*Q3+8*Q4) is defined and latched as the digital value 448 of Vref-digital=[Q4,Q3,Q2,Q1].

Figure 4B:
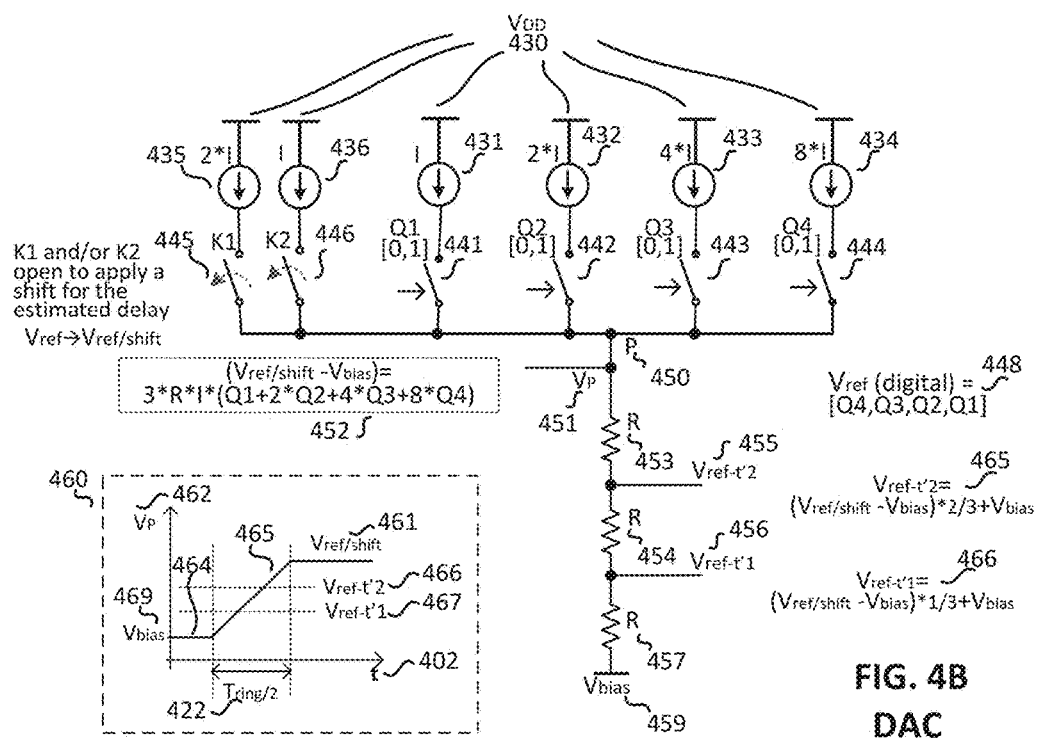
FIG. 4B is an example circuit diagram of the Digital-to-analog converter (DAC) of FIG. 3D.

FIG. 4B is an example circuit diagram of the Digital-to-Analog converter (DAC) of FIG. 3D. FIG. 4B presents an example of the reverse process of analog to digital conversion (ADC) of the latched reference voltage $V_{ref}$ (which presents the half ring time period) and generating the peak switching window fraction references $V_{ref-t1}$ and $V_{ref-t2}$ (in one example the references after applying some estimated delay are $V_{ref-t'1}$ and $V_{ref-t'2}$). The fraction references $V_{ref-t1}$ and $V_{ref-t2}$ define the start and end points of the peak switching window in a normal switching cycle of DCM operation with relaxation ringing. A similar structure of digital switches with the same referring labels is used and the constant current sources 431, 432, 433 and 434 are weighted 1*I, 2*I, 4*I and 8*I respectively. The current sources are coupled to switches Q1 441, Q2 442, Q3 443 and Q4 444 which are controlled by the ON or OFF state [0,1] of each binary digits of the latched value $V_{ref-digital}$=[Q4, Q3,Q2,Q1]. By closing the related digital switches by the digital command of $V_{ref-digital}$=[Q4,Q3,Q2,Q1] the constant current sources add up in parallel through node P 450 to generate the reference voltage drop: ($V_{ref}-V_{bias}$)=3*R*I* (Q1+2*Q2+4*Q3+8*Q4) across the series resistor 453, 454 and 457 of the voltage divider that also generates the fraction reference voltages $V_{ref-t'1}$ 456 and $V_{ref-t'2}$ 455 for the peak switching window request. The bias voltage level $V_{bias}$ 459 at low side of resistive voltage divider keeps the low side voltage above zero and the top side of resistive voltage divider has the total voltage drop due to summation of the current sources.

In one example, by opening switches K1 and/or K2 a percentage of current used for ADC programming could be removed that result in shifting to a lower voltage drop across the resistors. The shifted voltage at node P 450 and the shifted value of ($V_{ref/shift}-V_{bias}$) 452 lowers the generated fraction reference $V_{ref-t'1}$ 456 [presented by equation 466, $V_{ref-t'2}$=($V_{ref/shift}-V_{bias}$)*⅓+Vbias] and $V_{ref-t'2}$ 455 [presented by equation 465, $V_{ref-t'2}$=($V_{ref/shift}-V_{bias}$)*⅔+$V_{bias}$]. This causes a shift at start and end time (borders) of the peak switching window as depicted in FIGS. 5A and 5B. Shifting the window may compensate the possible propagation delay due to the control circuit blocks.

Graph 460 in FIG. 4B illustrates the voltage ramp up of charging voltage $V_{ch}$ 560 across the timing capacitor C1 550 (FIG. 5B) and situation of the shifted reference voltages $V_{ref-t'1}$ 467 and $V_{ref-t'2}$ 466 of the peak switching window borders in relation to the shifted reference voltage $V_{ref/shift}$ 461 that represents the top half ring time period $T_{ring}$/2 422 of relaxation oscillation when $V_{WND}>V_o$. Voltage $V_{ch}$ starts from a minimum point $V_{bias}$ 469 and remains on this minimum level 464 (while $V_{WND}<V_o$) until during the top half ring that $V_{ch}$ linearly ramps up 465 and at the end of top half ring time period $T_{ring}$/2 422 it reaches and latches on $V_{ref/shift}$ 461.

FIG. 5A illustrates a symmetric switching request window waveform, in accordance with the teachings of the present disclosure. As shown in FIG. 5A a top half ring voltage $V_{WND}$ 512 received at the output controller is above the output voltage Vo 514 during the sinusoidal half ring 515 of the relaxation oscillation. For a symmetric switching window, the half ring time period $T_{ring}$/2 508 is symmetrically divided to equal sections. In the example of FIG. 5A it is divided to three equal sections of T/3 502, 504 and 506. However, in other examples it may be divided to 5 or other odd sections to narrow down the width of the window.

FIG. 5B is an example circuit diagram of a charging circuit 540, in accordance with the teachings of the present disclosure. In one embodiment, after the reference voltage has been determined (e.g., detected and stored during handshaking) charging circuit 540 may utilize the window open and window close references and a current value of the voltage signal 505 to determine the borders of the switching window. Block 510 detects duration of the top half ring oscillation of output winding voltage $V_{WND}$ (on terminal 141 in FIG. 1A/B) of output controller above the output voltage Vo. The output winding voltage $V_{WND}$ 505 is applied to the non-inverting input of a comparator 512 and as long as it stays higher than the output voltage Vo 508 on the inverting input of the comparator 512 the output signal 530 is high activating the switch $S_{ch}$ 545 to linearly charge the timing capacitor C1 550 through the constant current source I1 544 coupled to $V_{DD}$ supply 542 and deactivating the discharging switch $S_{Dsh}$ 547 through the inverter 535. A small voltage level of bias and/or shift $V_{bias/shift}$ 549 prevents discharge of C1 550 to zero and the ramp up charge of C1 550 every cycle starts from this minimum voltage level $V_{bias/shift}$ 549. The linear ramp up charged voltage across the timing capacitor C1 550 at node $V_{ch}$ 560 is applied to non-inverting inputs 553 and 554 of the two comparators 551 and 552 respectively. The inverting inputs 555 and 556 of the comparators 551 and 552 receive the threshold/references $V_{ref-t'1}$ 555 and $V_{ref-t'2}$ 556, which were defined in ADC circuit of FIG. 4B, for the peak switching window width definition. The output signals L1 557 and L2 558 of comparators 551 and 552 (depicted in FIG. 5E) define the start and end borders of the peak switching window (window open and window close).

FIG. 5C illustrates a shifted switching request window waveform for delay compensation across an isolated interface, in accordance with the teachings of the present disclosure. FIG. 5C shows the hashed area of the peak switching window (the symmetrical 518 and the shifted unsymmetrical 520 with estimation of circuit delays) during time interval $\tau_{ring}$/2 508 (on time axis t 510) of the top half ring oscillation 515 of the output voltage $V_{WND}$ 512 while it is above the output voltage Vo 514. The left and right borders of the symmetrical peak switching window 518 are shifted ahead by Δt1 503 and Δt2 507 to compensate for the propagation delays of the control circuitry.

FIG. 5D illustrates a charging voltage waveform corresponding to the charging voltage of FIG. 5B. FIG. 5D shows the ramp up of the voltage $V_{ch}$ 560 charged across the timing capacitor C1 550 that starts from the minimum level of $V_{bias/shift}$ 566 and ramps linearly 565. At threshold of $V_{ref-t'1}$ 561 the intersection of 571 defines the start/begin t'1 573 of the peak switching window and threshold of $V_{ref-t'2}$ 562 at the intersection of 572 defines the end t'2 574 of the peak switching window. In one example after the second threshold intersection 572 reached, the charging switch $S_{ch}$ 545 may be opened and discharge switch $S_{Dch}$ 574 closed to start discharging the capacitor C1 (ramp down section 567) and speed up the process. FIG. 5E depicts the signals L1 583 (which is output 557 of comparators 551 in FIG. 5B) and signal L2 584 (which is output 558 of the comparators 552) which define the start and end borders of the switching window (window open and window close). Signal L1 583 changes state at t'1 573 from low to high (level 587) and commands for the start point of the peak switching window. Signal L2 584 changes state at t'2 574 from low to high (level 588) and commands for the ending of the peak switching window.

Figure 6A:
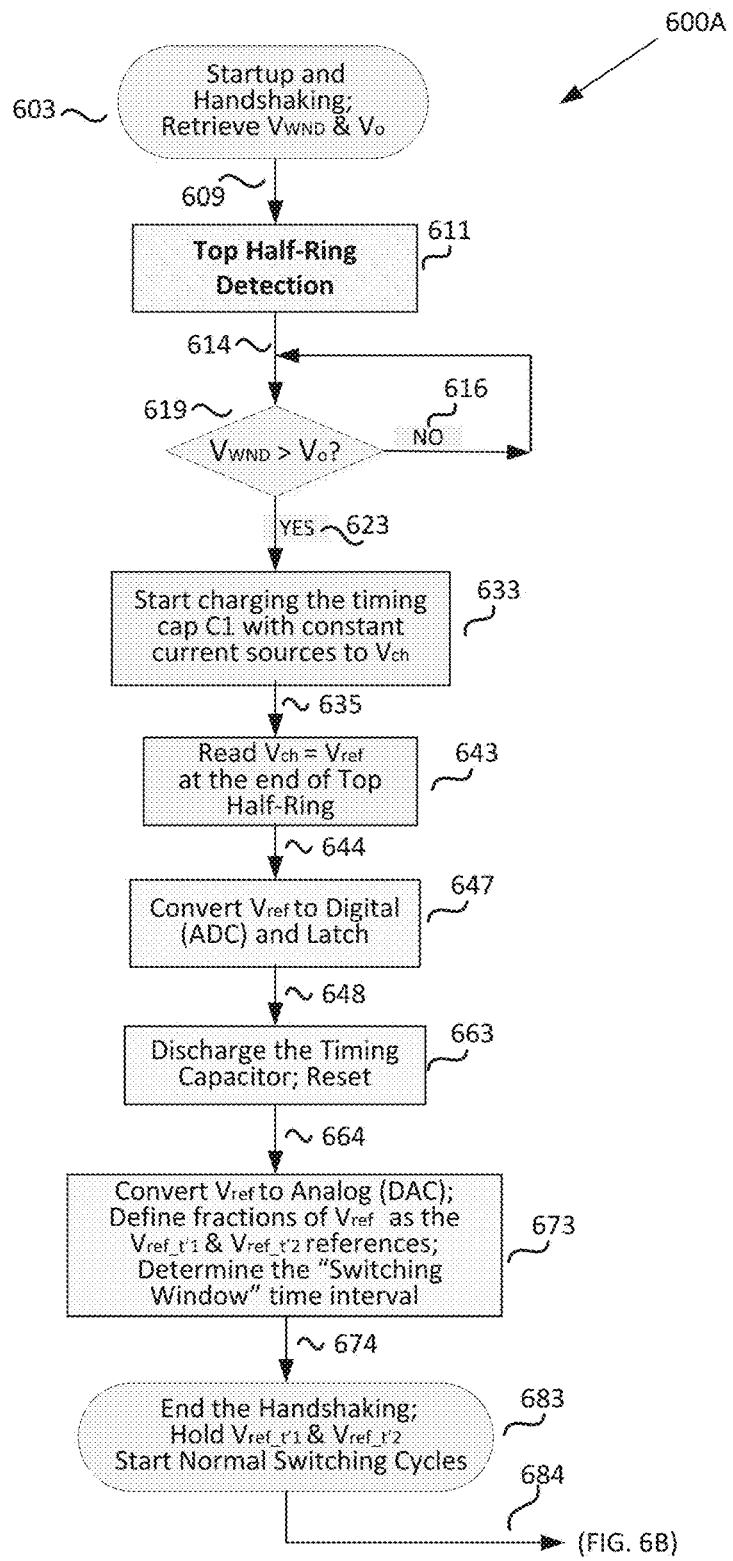
FIG. 6A is a flow chart illustrating an example process of generating a switching request window, in accordance with the teachings of the present disclosure.

FIG. 6A is a flow chart illustrating an example process 600A of generating a switching request window, in accordance with the teachings of the present disclosure. FIG. 6A introduces a flow chart at handshaking between the input and output controls at startup (power up). At startup the handshaking process (exchanging signals between input and output controllers) takes place to confirm the proper communication of information and switching enable signals. At startup, the input switching starts to increase the voltage on output winding, as called the output winding voltage $V_{WND}$ and at output Vo. Based on teaching of the present application during handshaking initialization the reference voltages are defined which are utilized in each switching cycle during the normal operation.

Block 603 shows a start of the handshaking process by retrieving winding voltage $V_{WND}$ and output voltage Vo which are then transferred through link 609 to the top half ring detection block 611 and is linked through 614 to a comparison conditional block 619 ($V_{WND}$>Vo, introducing comparator 312 in FIG. 3B). If the output winding voltage $V_{WND}$ is less than the output voltage Vo (option NO, 616), it shows that the output rectifier diode (D2 155 in FIG. 1) is still conducting and process closes back to 614 waiting till the/output winding voltage $V_{WND}$ gets greater than the output voltage Vo (option yes 623). At this time that the voltage signal $V_{WND}$ has increased to positive in reference to the output ground reference, the relaxation oscillations gets started and block 633 shows charging of the timing capacitor (C1, 350 in FIG. 3C) with a constant current source (IL 344 in FIG. 3C) to a charging voltage $V_{ch}$ 352. In block 643 at the end of top half ring the charging voltage $V_{ch}=V_{ref}$ is read and through link 644 is transferred to ADC block 647 to convert to digital and latched (to be hold). Block 663 through link 648 then shows the discharge of timing capacitor and reset (through switch $S_{Dch}$ 347 in FIG. 3C). Process 600A continues through 664 to DAC block 673 to convert the $V_{ref}$ digital to analog and define fractions of $V_{ref}$ as the references $V_{ref\_t'1}$ and $V_{ref\_t'2}$ (in one example $V_{ref\_t'1}=\frac{1}{3} V_{ref\_t'1}$ and $V_{ref\_t'2}=\frac{2}{3} V_{ref}$) to determine the "Switching Window" time interval. These references $V_{ref\_t'1}$ and $V_{ref\_t'2}$ for the "Switching Window" are then transferred 647 to block 683 to end the handshaking process and the "Switching Window" references $V_{ref\_t'1}$ and $V_{ref\_t'2}$ are being hold for process of "Switching Window" detection in each switching cycle during normal operation 684 (that is followed in FIG. 6B).

Figure 6B:
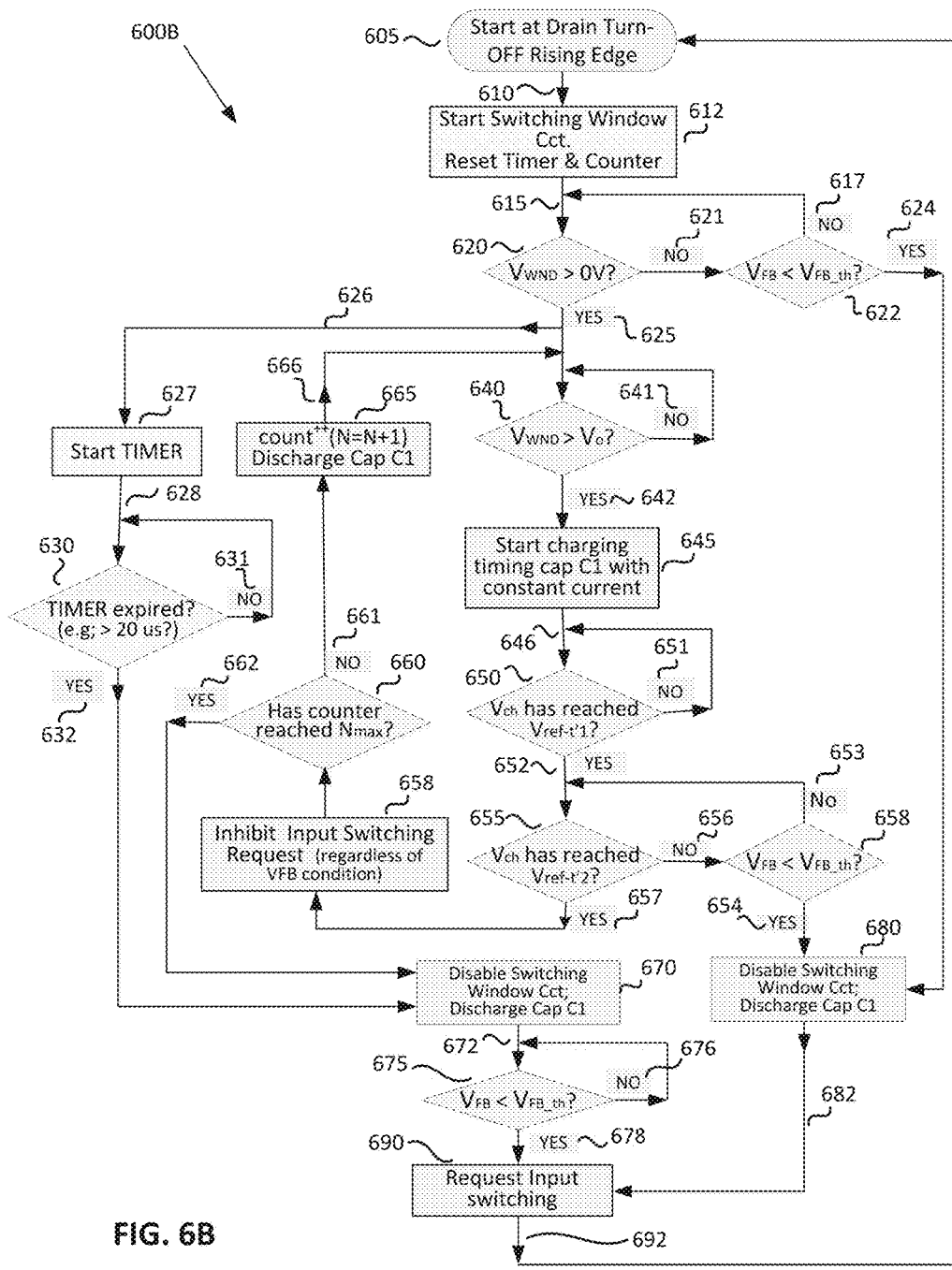
FIG. 6B is a flow chart illustrating an example process of utilizing a switching request window during normal operation of a power converter.

FIG. 6B is a flow chart illustrating an example process 600B of utilizing a switching request window during normal operation of a power converter to enable generation of a switching request signal at an estimated time of an extremum of the output winding voltage signal. FIG. 6B shows output controller peak ring detection window for each switching cycle during normal operation to achieve an efficient input and output synchronized switching based on the teachings of the present invention. The isolation barrier of the input and output control pulses, in one example is through magnetic communication between input and output controllers (other examples may include optical or other isolated couplings).

Process 600B starts at each switching cycle at input switch drain turn-off rising edge 605 through detecting the flyback secondary/output voltage falling edge. A rising edge detection signal 610 enables block 612 of the peak switching window circuit which resets the timer and sets a counter back to zero. Then link 615 goes to a conditional block 620 to check if the forward pin voltage is above zero. If the forward pin voltage is below zero (option NO 621), it means secondary/output is still conducting current and $V_{WND}$ by amount of a diode drop (~0.5-1V drop on rectifier device) is less than the output ground reference (load side). As long as the output rectifier is conducting, the feedback voltage $V_{FB}$ in conditional block 622 is compared to the feedback threshold level $V_{FB-th}$. If feedback voltage $V_{FB}$ is not below the feedback threshold level $V_{FB-th}$ (option NO 617), the small loop closes back to 615 and waits until either forward pin voltage $V_{WND}$ goes above zero (secondary/output conduction stops and it goes to DCM relaxation ringing) or the feedback voltage $V_{FB}$ goes below the feedback threshold level $V_{FB-th}$, option YES 624 which means regulation is not reached (e.g., during start up), in which case the peak switching window circuit is disabled and timing capacitor C1 is discharged. If forward pin voltage goes above zero (option YES 625 of block 620, which means the secondary/output conduction and transfer of energy in DCM has ended and relaxation ringing is starting). In this case in the conditional block 640 forward pin voltage $V_{WND}$ is compared to the output voltage Vo to find the ringing positive peak interval. Meanwhile, as a precaution in parallel with the main process of peak switching window, a timer 627 starts to keep track of a maximum time limit (timeout threshold, e.g; a timer expiration above 20 us). As long as the time limit has not reached (option NO 631) the loop closes back to 628 waiting for the time limit (timeout threshold). If the main process of peak switching window is not successfully completed in less than the time limit (timeout threshold) then upon expiration of time limit (timeout threshold), option YES 632, the switching window circuit is disabled and timing capacitor C1 is discharged (670).

Process 600B continues when output winding voltage $V_{WND}$ is greater than the output voltage Vo (option YES 642 of conditional block 640). Block 645 presents the charging process of timing cap (C1 550 in FIG. 5) with a constant current source (I1 541 in FIG. 5). While C1 is charging and $V_{ch}$ 560 across C1 550 is ramping up, the link 646 goes to conditional block 650 to check if $V_{ch}$ has reached to the first threshold $V_{reft1}$ (switching request window open). If $V_{ch}$ is below the $V_{ref-t'2}$ and above $V_{ref-t'1}$ ($V_{ref-t'1}<V_{ch}<V_{ref-t'2}$, option NO 656) the feedback threshold is checked in block 658 ($V_{FB}<V_{FB\_th}$). If $V_{FB}$ is below the expected threshold (option YES 654) it means that regulation is not satisfied and link 682 through block 690 requests input switching 692 and closes back through 692 to the start point of next switching cycle 605.

However, if $V_{FB}$ is above the feedback threshold ($V_{FB}>V_{FB\_th}$; option NO 653) the small loop goes back to 652 and waits to hit $V_{ref-t'2}$ (peak switching window closed). When it hits/exceeds $V_{ref-t'2}$ (option YES 657), the process inhibits the input switching request (block 658). Meanwhile the number of oscillations is checked in conditional block 660 and if counter has reached to the maximum count $N_{max}$ (in one example 4 oscillations), option YES 657, the peak switching window circuit is disabled and timing capacitor C1 is discharged (block 670) and switching request will be based on $V_{FB}$ hitting $V_{FB\_th}$ (block 675). If the counter has not yet reached to the maximum count $N_{max}$ (option NO 661), then discharges the timing capacitor C1 (block 565) to add up the count number and search for a new peak switching window in the next relaxation ring/oscillation (link 666 going back to start over from 625).

It is appreciated that, as mentioned above, in addition to the "count out" limitation/threshold for the number of relaxation oscillations, there is also a "time out" limitation for the maximum time duration before the process may stop searching for the peak window. The timer is reset at start of each switching cycle at 625 that through link 626 starts the timer 627 and keeps the time of process before the peak switching window search is complete. After the start timer block 627 the conditional block 630 checks if timer has expired (in one example 20 us expiration time or as called timeout). If the timer has not expired (option NO 631), it would continue tracking the time in a short waiting loop going back to 628 until the time expires (option YES 632). The switching window circuit is disabled and timing capacitor C1 is discharged (block 670). Then through link 672 the feedback signal is compared against the feedback threshold in conditional block 675 ($V_{FB}<V_{FB\_th}$?). The short waiting loop through option NO 676 waits till $V_{FB}<V_{FB\_th}$ (option YES 678) that input switching request 690 takes place and the process starts over through 692 to 605 for the next switching cycle.

Figure 7A:
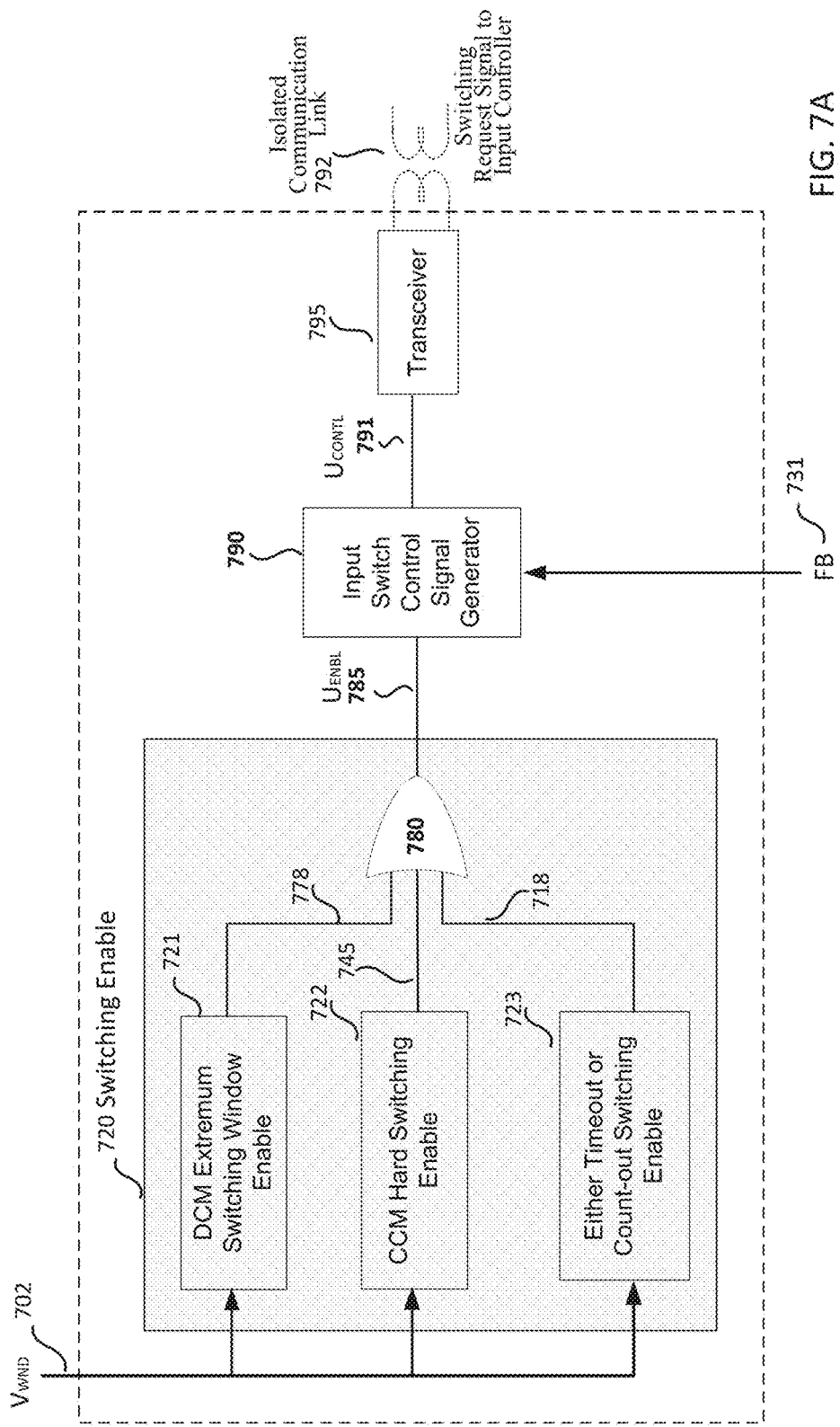
FIG. 7A is a functional block of an example output controller, in accordance with the teachings of the present disclosure.

FIG. 7A is a functional block of an example output controller, in accordance with the teachings of the present disclosure. FIG. 7A illustrates the conditions in different modes of operation for a synchronous isolated power converter that could enable the input controller switching request from the output controller through an isolated communication link. Data from the output winding voltage $V_{WND}$ 702 (appearing on terminal 141 of the secondary control 145 in FIG. 1) is processed for switching enable decision (demonstrated as block 720 switching enable process) to determine mode and condition of operation. Based on teaching of the present application three cases may happen to activate/enable the input switching request from the output controller.

In a first case, DCM operation is recognized by the relaxation oscillations 285 that may happen at the end of switching cycle (usually at low loads) around the output voltage Vo 288 (depicted in graph 280 of FIG. 2C). In the case of DCM operation with the output winding voltage relaxation oscillations ($V_{WND}$ 223 in FIG. 2A) a portion near the extremum of the top half ring above the output voltage is defined, such that extremum switching window enable circuit 721 generates a switching request window signal 778 to enable the input switch control signal generator. As shown, the input switch control signal generator 790 may communicate the control signal 791 via transceiver 795 and communication link 792 if the control signal generator 790 is enabled and if the feedback signal 731 indicates a change in the output ($V_{FB}<V_{FB\_th}$).

If the DCM operation is not detected and at the end of switching cycle still the voltage $V_{WND}$ (223 in FIG. 2A) is slightly below zero (by an amount of output diode forward drop), then in a second case, CCM hard switching enable circuit 722 may enable the control signal generator 790, to generate control signal $U_{CONT}$ 791 in response to FB signal 731 ($V_{FB}<V_{FB\_th}$).

In a third case of operation of the circuit of FIG. 7A, a timeout or count-out circuit 723 may provide a forced condition that includes enabling the input switch control signal generator 790 after a predefined timeout or a count-out of a predefined number of relaxation ringing. It is appreciated that the third condition may also be applied when the ringing is damped below a minimum amplitude (in one example when amplitude or ringing goes below 1 Volt).

The OR gate 780 (equivalent to OR gate 780 in FIG. 7B) indicates that any of the three cases could individually enable the switching request to the input power switch. The signal $U_{ENBL}$ 785 (equivalent to signal $U_{ENBL}$ 785 in FIG. 7B) enables generation of the input switch control signal (signal $U_{CONTL}$ 791 in FIG. 7B), provided that the feedback FB signal 731 is below the feedback threshold (in FIG. 7B $V_{FB}<V_{FB\_th}$ and signal 733 high) which means the output drop demands the input switch turn on and transfer of energy to the output. The output signal $U_{CONTL}$ 791 from block 790 through transmitter 795 and through the isolated communication link 792 sends the switching request signal to the input controller.

Figure 7B:
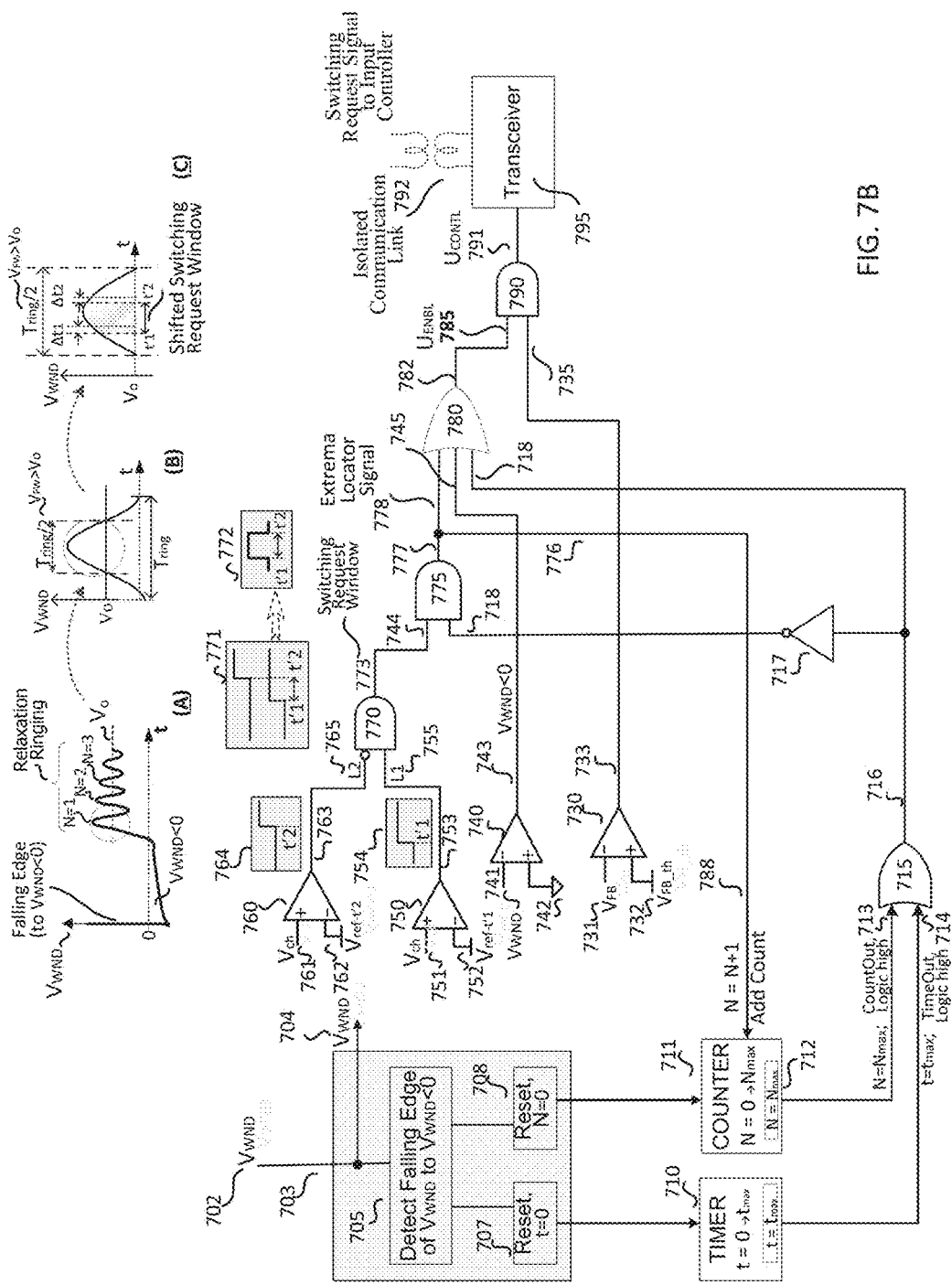
FIG. 7B is an example circuit diagram illustrating one possible implementation of the output controller of FIG. 7A.

FIG. 7B is an example circuit diagram illustrating one possible implementation of the output controller of FIG. 7A. FIG. 7B shows an example of the logic circuit to implement the extremum switching window search based on the teachings of the present invention. In operation of the circuit of FIG. 7B, transceiver 795 starts each switching cycle at input switch turn-off to find the switching request time window and communicate with the input controller for the next turn on of the switch at an extremum of the output winding voltage to reduce (e.g., minimize) the switching loss. Graphs (A), (B) and (C) in FIG. 7B are the repeated demonstration from previous figures to help better understanding of the signals in logic blocks of FIG. 7B. Graph (A) illustrates a simplified sample of the relaxation ringing on output winding voltage $V_{WND}$ of the flyback transformer secondary/output winding. Graph (B) defines a top half ring of one oscillation (relaxation ring). Graph (C) defines status of the peak (extremum) switching window during a top half ring for a symmetric as well as the time shifted window.

The output winding voltage $V_{WND}$ 702 from output winding applies to the terminal 703 of the extremum switching request circuitry of the output controller. The falling edge of $V_{WND}$ 702 while going towards $V_{WND}<0$ is detected in block 705 and the generated signals reset the counter count in 708 on N=0 and the timer in 707 on t=0. Comparator 750 receives the charging voltage $V_{ch}$ (ref to FIG. 5B) on non-inverting input 751 and compares to the threshold $V_{ref-t'2}$ (ref to FIG. 5D) on inverting input 752. The output signal 753 goes high at t=t'1 (754; same as signal L1 in FIG. 5E) which defines the left border (begin) of the extremum switching window.

Comparator 760 receives the charging voltage $V_{ch}$ on non-inverting input 761 and compares to the threshold $V_{ref-t'2}$ on inverting input 762. The output signal 763 goes high at t=t'2 764, (ref to signal L2 in FIG. 5E) which defines the ending border of the peak switching window. The AND gate 770 in response to the input signals L1 755 and L2 765 generates the output 773 which defines the switching request window as illustrated by graphs 771 and 772 introducing the start time t'1 and the end time t'2 of the peak (extremum) switching window during each top half ring of the relaxation oscillation/ringing. The AND gate 775 receives output 773 of the AND gate 770 on its first input 744. The second input 718 is coupled through an inverter to the output 716 of the OR gate 715. If Timer 710 is not time-out and counter 711 is not count-out (none of 713 or 714 is logic high) signal 716 remains logic low, signal 718 is logic high and the AND gate 775 responds to the extremum switching window on its input 744. The output signal 777 is coupled to the first input 778 of the OR gate 780.

The second input 745 of the OR gate 780 defines the second condition (case 2) for the input switching request is the CCM operation wherein the forward voltage from output winding ($V_{WND}$ 704), due to the forward drop of the output rectifier, at the end of switching cycle remains below zero potential (below output ground reference) and the input switching request may happen in response to the feedback signal $V_{FB}$ based on the power converter output regulation requirement. Comparator 740 compares $V_{WND}$ on inverting input 741 to ground reference (e.g., output ground reference) on non-inverting input 742 and the output signal 743 (logic high at $V_{WND}$<0) is coupled to the second input 745 of the OR gate 780.

The third case/condition for the input switching request activation/enabling is through the count-out or time-out signals 713 and 714. Timer 710 keeps the time duration of the process from t=0 up to a maximum time-out $t_{max}$ (In one example; $t_{max}$=20 us). The Counter 711 keeps track of number of relaxation oscillations that the peak (extremum) switching window is detected up to a maximum count-out $N_{max}$ (In one example; $N_{max}$=4 oscillations). Either when the timer 710 is time-out or counter 711 is count-out signal 716, through inverter 717, on input 718 of the AND gate 775 goes logic low and pulls signal 777 at output of AND gate 775 to logic low and prevents response to the extremum switching window signal 744.

Counter 711 receives signal 788 (Add Count; N=N+1) from output 777 of the AND gate 775 which goes high during the extremum switching window. As a result signal 788 may command for adding the count number N=N+1 at either rising or falling edge of signal 777. In one embodiment in addition to the limitation of $t_{max}$ and $N_{max}$ other conditions may also be implied. For example when the amplitude of relaxation oscillations is damped and goes below a threshold (e.g., when the oscillation amplitude damps below 1 V) the input switching request would anyway be initiated.

Output 782 of the OR gate 780 by activation of any of above mentioned three cases/conditions pulls the enabling signal $U_{ENBL}$ to logic high at the first input of AND gate 790. The second input of the AND gate 790 is coupled to the signal 733 at output of feedback comparator 730. When $V_{FB}<V_{FB\_th}$, the power converter output is in the regulated condition, signal 733 at output of feedback comparator 730 and on the input 736 of the AND gate 790 is logic high which results in logic high signal 791 at output of AND gate 790 that provides $U_{CONL}$ signal to the transmitter block 795 and through the isolated communication link/coupling 792 the switching request signal is transmitted to the input controller to command the turn-on of the input switch.

FIG. 8A illustrates an expanded portion of the waveform of FIG. 2C. FIG. 8B is an example circuit diagram illustrating one possible implementation of the extremum switching window enable block of FIG. 7A. FIG. 8C illustrates a charging voltage waveform corresponding to the charging voltage of FIG. 8B. FIGS. 8A-C introduce an alternative to the embodiment of FIG. 7B, that could be used to estimate the location of peak on the relaxation ringing and enable switching request of the input switch.

FIG. 8A is an expanded portion of the graph illustrated in FIG. 2C that shows the view of the output winding voltage $V_{WND}$ in a DCM switching cycle with relaxation ringing that happens after the energy transfer and conduction through the output rectifier has come to an end. FIG. 8A is the magnified/expanded view of the first oscillation that may be used in this alternate option for estimating the time of the extremum. The similar numbers on this graph refer to the same labels on graph 280 of FIG. 2C. In DCM operation when the output rectifier is still conducting, 283 in FIG. 2C, the output winding voltage $V_{WND}$ remains below zero by an amount of output rectifier forward drop. When the transfer of energy has ended and output rectifier has stopped conducting (point A on FIG. 2C) the winding voltage crosses to positive (e.g., greater than output ground reference) and ringing starts (relaxation oscillation, which also appears across the secondary synchronous rectifier (across MOSFET 250 at OFF state). Then the winding voltage $V_{WND}$ increases and rings above and below the output voltage. Output voltage Vo remains regulated by the feedback loop. At point B the output winding voltage crosses the output voltage and increases to the extremum at point P $V_{extremal}$, 289. The relaxation oscillation (ringing) continues with a fixed ringing frequency (that is a function of total inductance and capacitance seen on output winding side). The ringing damps with some damping factor that is a function of the load resistance at the output. The fixed frequency of ringing in the timing from A to B, $\tau 1$ 891 and the timing from B to P, $\tau 2$ 892 are both equal to a quarter of the oscillation time period 284. Thus, according to at least one embodiment the time interval between points A and B is measured and a delay for the same time interval is introduced once the winding voltage reaches a value of the output voltage, which provides an estimate of the time at which the first extremum occurs.

The logic block in FIG. 8B introduces an equivalent replacement for the upper portion of the logic block in FIG. 7B (e.g., extrema/peak switching window enable block 721 of FIG. 7A) that generates the extremum locator signal 778. The winding voltage $V_{WND}$ 802 is coupled to positive input 808 of the comparator 810 comparing to the output ground reference 801 on negative input 809. When $V_{WND}>0$ signal 811 at output of comparator 810 goes high and is coupled to first input 821 of the AND gate 820. As well, the winding voltage $V_{WND}$ 802 is coupled to negative input 806 of the comparator 815 comparing to the output voltage Vo on positive input 805. As long as $V_{WND}<V_o$ the output signal of comparator 815 remains high and is coupled to second input 822 of the AND gate 820. Output 823 of the AND gate 820 is coupled to the first input 831 of the OR gate 830 and when signal 823 at the time interval $\tau 1$ 891 (between points A and B) goes high the signal 833 at output of OR gate 830 would also go logic high activating/closing switch $S_t$ 854. Then the constant current source $I_t$ 852 starts charging the timing capacitor $C_t$ 856 through supply $V_{CC}$ 850 with a linear slope. The timing voltage $V_{Ct}$ 855 increases linearly as a representative of the timing in interval $\tau 1$ 891. At the end of this interval the voltage $V_{Ct}$ 855 across the timing capacitor $C_t$ 856 presents the timing of approximately a quarter oscillation cycle (from zero voltage, point A, to the crossing of output voltage, point B). Then the signal 822 at output of comparator 815 goes logic low, pulling signal 823 to low. However, when the output signal of comparator 818 drops low at input 824 of the inverter 825, the output 826 of the inverter 825 goes logic high and is coupled to the second input 832 of the OR gate 830 forcing its output signal 833 to remain high and keep switch $S_t$ 854 at the ON position (closing state) to continue charging the timing capacitor $C_t$ 856 with the same slope through the current source $I_t$ 852 coupled to the supply $V_{CC}$ 850.

When the output winding voltage $V_{WND}$ exceeds the output voltage Vo at point B the single shot edge trigger block 840 at its input 841 receives a state change (at time $t_B$) from logic low to logic high 843 to generate a narrow single shot pulse 844 at its output 842. Signal 842 which is a narrow pulse 844 activates and closes switch 845 momentarily and the sample and hold block 860 records (samples and holds) the voltage value $V_{Ct}$ of the timing capacitor $C_t$ at time $t_B$ (point B' on graph 880, FIG. 8C which is equivalent to point B on FIG. 8A) Voltage at point B' 886 represents the first time interval τ1 891, at output of sample and hold unit 860 that is coupled to the negative input 872 of the comparator 870. From point B to point P on FIG. 8A, during interval τ2 892 switch $S_t$ 854 remains at ON state to continue charging the timing capacitor $C_t$ 856. Voltage $V_{it}$ 885 on FIG. 8C continues to increase linearly from $V_{Ct1}$ 883 and after a time interval τ2=τ1 (891 & 892 on FIG. 8A or on FIG. 8C graph 880) at point P' 887, which is equivalent to point P 289 (first extremum $V_{extremal}$) on graph 290, at time $t_P$ 882 reaches to a value $V_{Ct2}=2V_{Ct1}$.

A Divider, that in one example could be a resistive divider consisting of equal value resistors 861 and 862 applies half of the voltage $V_{Ct}$ 885 from the divider middle point 863 to the positive input 871 of the comparator 870 to be compared to the sampled and hold value of $V_{Ct1}$. As soon as the timing capacitor voltage reaches to $V_{Ct2}=2V_{Ct1}$ it indicates the peak (extremum) location on the first ring of relaxation oscillation and the extremum locator/estimator signal 873 at output of comparator 870 goes to logic high.

In one example the condition in CCM operation ($V_{WND}$<0), the feedback and regulation requirement ($V_{FB}$<$V_{FB\_th}$) and any extra required feature such as a timeout or count-out conditions may also be considered and included as indicated in example of FIG. 7B. This alternate option of peak (extremum) locator may be improved by including feature of searching for subsequent extrema locations and including effect of feedback regulation as was mentioned in the first method of implementation. If at the time that peak (extremum) location is detected the feedback signal condition is not satisfied (feedback is not below the feedback threshold, $V_{FB}$<$V_{FB\_th}$), then the switching request is delayed till the next detection of peak (extremum) location.

The subsequent extrema locations could be detected by various ways. In one example it could be by comparison of time intervals τ3 893 and τ4 894 for the second ring. If required this comparison may continue for the second, third or further oscillations/ringing.

In another example it could be implemented by comparison of the first quarter ring time interval τ1 891 in FIG. 8A with a time interval 6τ1 that presents the location of the second oscillation extremum or by comparing time interval τ1 with 10τ1 that presents location of the third ring/oscillation extremum and so on. In a simple idea the implementation of the time interval comparisons may be introduced by resistive dividers as illustrated for the first extremum detection in FIG. 7B. Instead of a ½ ratio divider (resistors 861 and 862) it can be introduced by a ratio of ⅙ divider for the second ring peak (extremum) detection. Similarly for the third ring peak (extremum) it can be introduced by a ratio of 1/10 divider.

It is appreciated that the example circuit diagram illustrated in FIG. 8B may only be a partial circuit of all the features included in the circuit of FIG. 7B. For example, the circuit of FIG. 8B could be combined with the feedback circuit 730 such that the switching request signal is generated at one of the extremum locations when the feedback signal demands a switching. Furthermore, the extra features of timeout or count-out could also be implemented in conjunction with the circuit of FIG. 8B.

What is claimed is:

1. A method for regulating a transfer of energy between an input side and an output side of a power converter through an energy transfer element, comprising:
   receiving a feedback signal representative of an output of the power converter with a switch control signal generator included in a first controller coupled to the output side of the power converter and an output ground reference;
   communicating a control signal from the switch control signal generator via a communication link to a second controller coupled to the input side of the power converter and an input ground reference, wherein the input ground reference coupled to the second controller and the output ground reference coupled to the first controller are different;
   initiating a transition of a switch coupled to the input side of the power converter from an OFF state to an ON state to regulate the transfer of energy from the input side of the power converter to the output side of the power converter after the switch control signal generator receives an enable signal and if the feedback signal indicates a change in the output of the power converter; and
   generating the enable signal with an extremum locator to enable the switch control signal generator to communicate the control signal to the second controller in response to a first signal that is representative of an instantaneous voltage on an output terminal of the energy transfer element that oscillates in response to an ending of the transfer of energy to the output side of the power converter, wherein the extremum locator enables the switch control signal generator such that the transition of the switch from the OFF state to the ON state occurs substantially at a time that the first signal reaches an extremum.

2. The method of claim 1, wherein an oscillation of the first signal includes multiple extrema, and wherein the method further comprises estimating with the extremum locator a time at which the first signal reaches a first extremum that occurs after the ending of the transfer of energy and enabling the switch control signal generator such that the transition of the switch from the OFF state to the ON state occurs at the estimated time at which the first signal reaches the first extremum.

3. The method of claim 2, further comprising estimating with the extremum locator a time at which the first signal reaches a subsequent extremum that occurs after the first extremum and enabling the switch control signal generator such that the transition of the switch from the OFF state to the ON state occurs at the estimated time at which the first signal reaches the subsequent extremum.

4. The method of claim 1, further comprising controlling with the second controller switching of the switching of the switch coupled to the input side of the power converter between the ON state and the OFF state to regulate the transfer of energy from the input side of the power converter to the output side of the power converter.

5. The method of claim 1, further comprising enabling the switching control signal generator with a continuous conduction mode (CCM) detector in response to detecting CCM operation of the power converter.

6. The method of claim 5, further comprising detecting that the first signal is less than the output ground reference with a comparator included in the CCM detector to enable the switching control signal generator.

7. The method of claim 1, further comprising comparing the feedback signal with a feedback threshold with a feedback circuit, and communicating with the switch control signal generator the control signal to the second controller when enabled and if the feedback circuit indicates that the feedback signal is less than the feedback threshold.

8. The method of claim 1, further comprising enabling with a time-out detection circuit the switching control signal generator after a time threshold to ensure that the switching signal generator is enabled at least once each switching cycle period.

9. The method of claim 8, further comprising enabling with the time-out detection circuit the switching control signal generator in response to an occurrence of a threshold number of oscillations of the first signal.

* * * * *